(12) United States Patent
Kakaiya et al.

(10) Patent No.: US 12,443,477 B2
(45) Date of Patent: Oct. 14, 2025

(54) METHOD AND APPARATUS FOR HIGH-PERFORMANCE PAGE-FAULT HANDLING FOR MULTI-TENANT SCALABLE ACCELERATORS

(71) Applicant: Intel Corporation, Santa Clara, CA (US)

(72) Inventors: Utkarsh Y. Kakaiya, Folsom, CA (US); Philip Lantz, Cornelius, OR (US); Sanjay Kumar, Hillsboro, OR (US); Rajesh Sankaran, Portland, OR (US); Narayan Ranganathan, Banglore (IN); Saurabh Gayen, Portland, OR (US); Dhananjay Joshi, Portland, OR (US); Nikhil P. Rao, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 17/560,170

(22) Filed: Dec. 22, 2021

(65) Prior Publication Data

US 2023/0042934 A1 Feb. 9, 2023

Related U.S. Application Data

(60) Provisional application No. 63/226,159, filed on Jul. 27, 2021.

(51) Int. Cl.
*G06F 11/00* (2006.01)
*G06F 11/07* (2006.01)

(52) U.S. Cl.
CPC ........ *G06F 11/079* (2013.01); *G06F 11/0775* (2013.01); *G06F 11/0784* (2013.01)

(58) Field of Classification Search
CPC . G06F 11/079; G06F 11/0775; G06F 11/0784
See application file for complete search history.

(56) References Cited

U.S. PATENT DOCUMENTS

2017/0132083 A1* 5/2017 Aslot .................... G06F 11/073
2020/0401440 A1 12/2020 Sankaran et al.
(Continued)

FOREIGN PATENT DOCUMENTS

| EP | 4124964 A1 | 2/2023 |
| WO | 2012/082864 A1 | 6/2012 |

OTHER PUBLICATIONS

European Search Report and Search Opinion, EP App. No. 22181043.5, Dec. 6, 2022, 7 pages.
(Continued)

*Primary Examiner* — Philip Guyton
*Assistant Examiner* — Sean Kevin McNamara
(74) *Attorney, Agent, or Firm* — NICHOLSON DE VOS WEBSTER & ELLIOTT LLP

(57) ABSTRACT

Apparatus and method for high-performance page fault handling. For example, one embodiment of an apparatus comprises: one or more accelerator engines to process work descriptors submitted by clients to a plurality of work queues; fault processing hardware logic associated with the one or more accelerator engines, the fault processing hardware logic to implement a specified page fault handling mode for each work queue of the plurality of work queues, the page fault handling modes including a first page fault handling mode and a second page fault handling mode.

18 Claims, 27 Drawing Sheets

(56) References Cited

U.S. PATENT DOCUMENTS

| | | |
|---|---|---|
| 2021/0064525 A1 | 3/2021 | Tian et al. |
| 2021/0149815 A1 | 5/2021 | Gayen et al. |
| 2022/0197816 A1* | 6/2022 | Powley ............... G06F 12/0886 |
| 2023/0350681 A1* | 11/2023 | Anderson ........... G06F 9/30014 |

OTHER PUBLICATIONS

Decision to grant, EP App. No. 22181043.5, May 3, 2024, 2 pages.
Intention to grant, EP App. No. 22181043.5, Jan. 5, 2024, 7 pages.

* cited by examiner

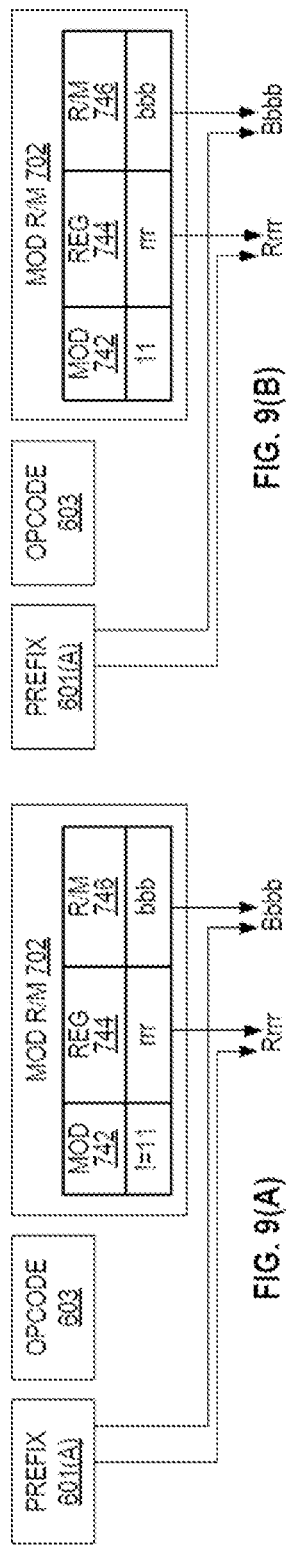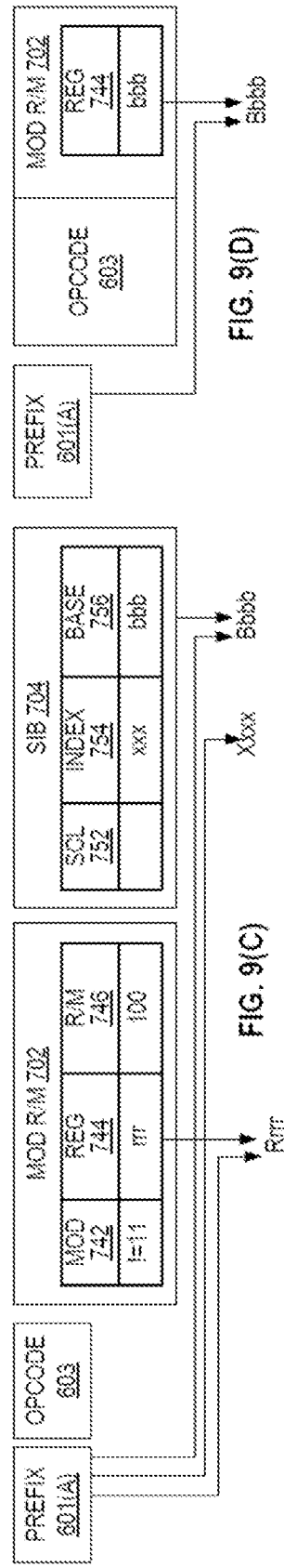

| Byte 7 | Byte 6 | Byte 5 | Byte 4 | Byte 3 | Byte 2 | Byte 1 | Byte 0 | bytes |
|---|---|---|---|---|---|---|---|---|
| | PASID | | Operation | Batch ID | WQ Index | Error | Flags | 0 |
| | Error Information | | | | | Batch Index | | 8 |
| Event Log Fault Address | | | | | | | | 16 |
| Completion Record | | | | | | | | 24 |
| | | | | | | | | 32 |
| | | | | | | | | 40 |
| Reserved | | | | | | | | 48 |
| | | | | | | | | 56 |
| | | | | | | | | ... |
| | | | | | | | | N-8 |

EVENT LOG ENTRY 2100

METHOD AND APPARATUS FOR HIGH-PERFORMANCE PAGE-FAULT HANDLING FOR MULTI-TENANT SCALABLE ACCELERATORS

CROSS REFERENCE TO RELATED APPLICATION

This application claims the benefit of co-pending U.S. Provisional Patent Application No. 63/226,159, filed Jul. 27, 2021, all of which is herein incorporated by reference.

BACKGROUND

Field of the Invention

This invention relates generally to the field of computer processors. More particularly, the invention relates to a method and apparatus for high-performance page-fault handling for multi-tenant scalable accelerators.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

BRIEF DESCRIPTION OF THE DRAWINGS

A better understanding of the present invention can be obtained from the following detailed description in conjunction with the following drawings, in which:

A better understanding of the present invention can be obtained from the following detailed description in conjunction with the following drawings, in which:

FIG. 8 illustrates one embodiment of an instruction prefix;

FIGS. 9A-D illustrate embodiments of how the R, X, and B fields of the prefix are used;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 1:
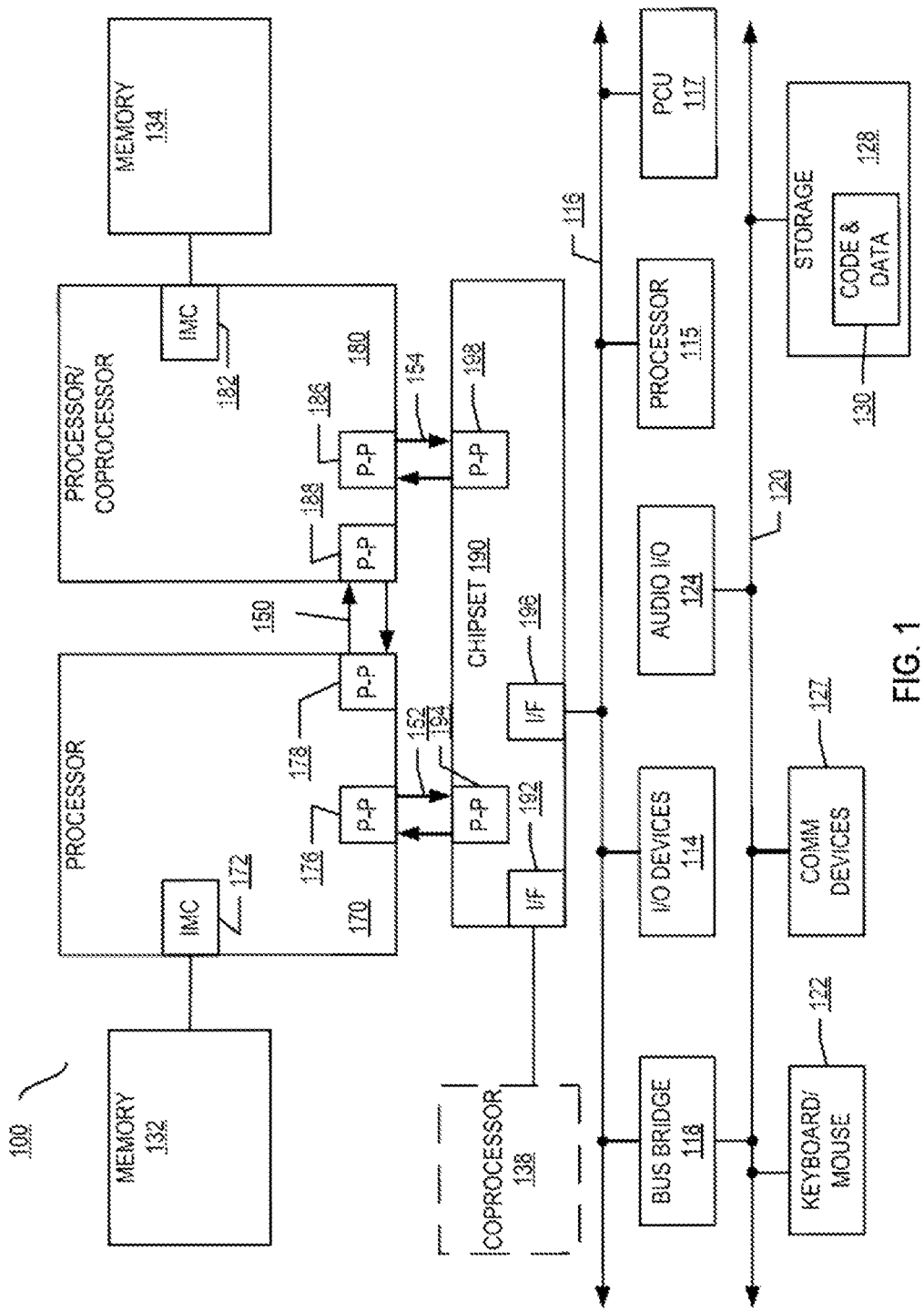
FIG. 1 illustrates an example computer system architecture.

FIG. 1 illustrates embodiments of an exemplary system. Multiprocessor system 100 is a point-to-point interconnect system and includes a plurality of processors including a first processor 170 and a second processor 180 coupled via a point-to-point interconnect 150. In some embodiments, the first processor 170 and the second processor 180 are homogeneous. In some embodiments, first processor 170 and the second processor 180 are heterogenous.

Processors 170 and 180 are shown including integrated memory controller (IMC) units circuitry 172 and 182, respectively. Processor 170 also includes as part of its interconnect controller units point-to-point (P-P) interfaces 176 and 178; similarly, second processor 180 includes P-P interfaces 186 and 188. Processors 170, 180 may exchange information via the point-to-point (P-P) interconnect 150 using P-P interface circuits 178, 188. IMCs 172 and 182 couple the processors 170, 180 to respective memories, namely a memory 132 and a memory 134, which may be portions of main memory locally attached to the respective processors.

Processors 170, 180 may each exchange information with a chipset 190 via individual P-P interconnects 152, 154 using point to point interface circuits 176, 194, 186, 198. Chipset 190 may optionally exchange information with a coprocessor 138 via a high-performance interface 192. In some embodiments, the coprocessor 138 is a special-purpose processor, such as, for example, a high-throughput MIC processor, a network or communication processor, compression engine, graphics processor, GPGPU, embedded processor, or the like.

A shared cache (not shown) may be included in either processor 170, 180 or outside of both processors, yet connected with the processors via P-P interconnect, such that either or both processors' local cache information may be stored in the shared cache if a processor is placed into a low power mode.

Chipset 190 may be coupled to a first interconnect 116 via an interface 196. In some embodiments, first interconnect 116 may be a Peripheral Component Interconnect (PCI) interconnect, or an interconnect such as a PCI Express interconnect or another I/O interconnect. In some embodiments, one of the interconnects couples to a power control unit (PCU) 117, which may include circuitry, software, and/or firmware to perform power management operations with regard to the processors 170, 180 and/or co-processor 138. PCU 117 provides control information to a voltage regulator to cause the voltage regulator to generate the appropriate regulated voltage. PCU 117 also provides control information to control the operating voltage generated. In various embodiments, PCU 117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 117 is illustrated as being present as logic separate from the processor 170 and/or processor 180. In other cases, PCU 117 may execute on a given one or more of cores (not shown) of processor 170 or 180. In some cases, PCU 117 may be implemented as a microcontroller (dedicated or general-purpose) or other control logic configured to execute its own dedicated power management code, sometimes referred to as P-code. In yet other embodiments, power management operations to be performed by PCU 117 may be implemented externally to a processor, such as by way of a separate power management integrated circuit (PMIC) or another component external to the processor. In yet other embodiments, power management operations to be performed by PCU 117 may be implemented within BIOS or other system software.

Various I/O devices 114 may be coupled to first interconnect 116, along with an interconnect (bus) bridge 118 which couples first interconnect 116 to a second interconnect 120. In some embodiments, one or more additional processor(s) 115, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 116. In some embodiments, second interconnect 120 may be a low pin count (LPC) interconnect. Various devices may be coupled to second interconnect 120 including, for example, a keyboard and/or mouse 122, communication devices 127 and a storage unit circuitry 128. Storage unit circuitry 128 may be a disk drive or other mass storage device which may include instructions/code and data 130, in some embodiments. Further, an audio I/O 124 may be coupled to second interconnect 120. Note that other architectures than the point-to-point architecture described above are possible. For example, instead of the point-to-point architecture, a system such as multiprocessor system 100 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 2:
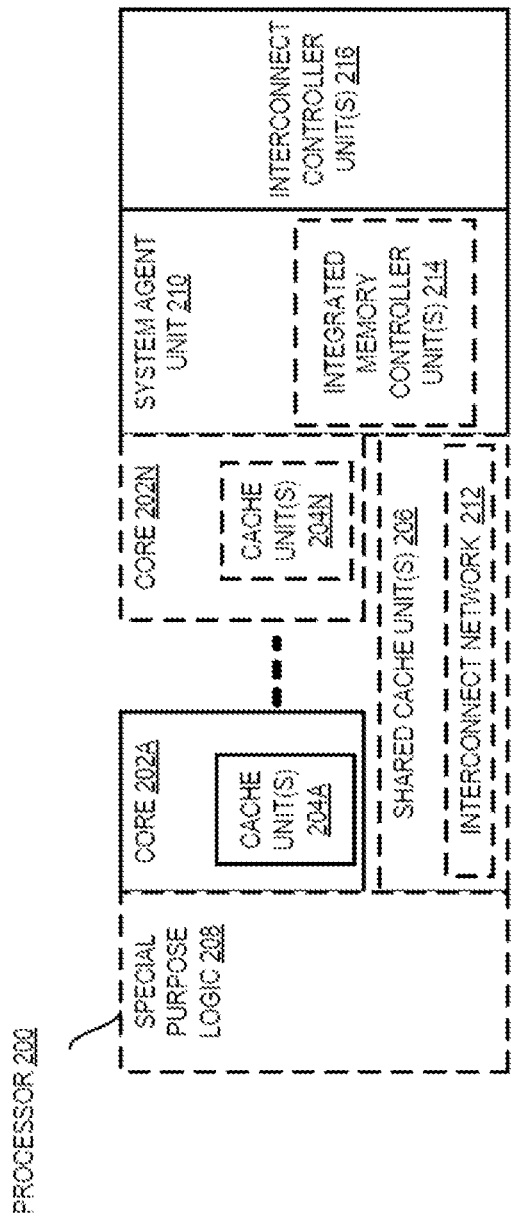
FIG. 2 illustrates a processor comprising a plurality of cores.

FIG. 2 illustrates a block diagram of embodiments of a processor 200 that may have more than one core, may have an integrated memory controller, and may have integrated graphics. The solid lined boxes illustrate a processor 200 with a single core 202A, a system agent 210, a set of one or more interconnect controller units circuitry 216, while the optional addition of the dashed lined boxes illustrates an alternative processor 200 with multiple cores 202(A)-(N), a set of one or more integrated memory controller unit(s) circuitry 214 in the system agent unit circuitry 210, and special purpose logic 208, as well as a set of one or more interconnect controller units circuitry 216. Note that the processor 200 may be one of the processors 170 or 180, or co-processor 138 or 115 of FIG. 1.

Thus, different implementations of the processor 200 may include: 1) a CPU with the special purpose logic 208 being integrated graphics and/or scientific (throughput) logic (which may include one or more cores, not shown), and the cores 202(A)-(N) being one or more general purpose cores (e.g., general purpose in-order cores, general purpose out-of-order cores, or a combination of the two); 2) a coprocessor with the cores 202(A)-(N) being a large number of special purpose cores intended primarily for graphics and/or scientific (throughput); and 3) a coprocessor with the cores 202(A)-(N) being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

A memory hierarchy includes one or more levels of cache unit(s) circuitry 204(A)-(N) within the cores 202(A)-(N), a set of one or more shared cache units circuitry 206, and external memory (not shown) coupled to the set of integrated memory controller units circuitry 214. The set of one or more shared cache units circuitry 206 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 212 interconnects the special purpose logic 208 (e.g., integrated graphics logic), the set of shared cache units circuitry 206, and the system agent unit circuitry 210, alternative embodiments use any number of well-known techniques for interconnecting such units. In some embodiments, coherency is maintained between one or more of the shared cache units circuitry 206 and cores 202(A)-(N).

In some embodiments, one or more of the cores 202(A)-(N) are capable of multi-threading. The system agent unit circuitry 210 includes those components coordinating and operating cores 202(A)-(N). The system agent unit circuitry 210 may include, for example, power control unit (PCU) circuitry and/or display unit circuitry (not shown). The PCU may be or may include logic and components needed for regulating the power state of the cores 202(A)-(N) and/or the special purpose logic 208 (e.g., integrated graphics logic). The display unit circuitry is for driving one or more externally connected displays.

The cores 202(A)-(N) may be homogenous or heterogeneous in terms of architecture instruction set; that is, two or more of the cores 202(A)-(N) may be capable of executing the same instruction set, while other cores may be capable of executing only a subset of that instruction set or a different instruction set.

Exemplary Core Architectures
In-Order and Out-of-Order Core Block Diagram

Figure 3A:
FIG. 3A illustrates a plurality of stages of a processing pipeline.
Figure 3B:
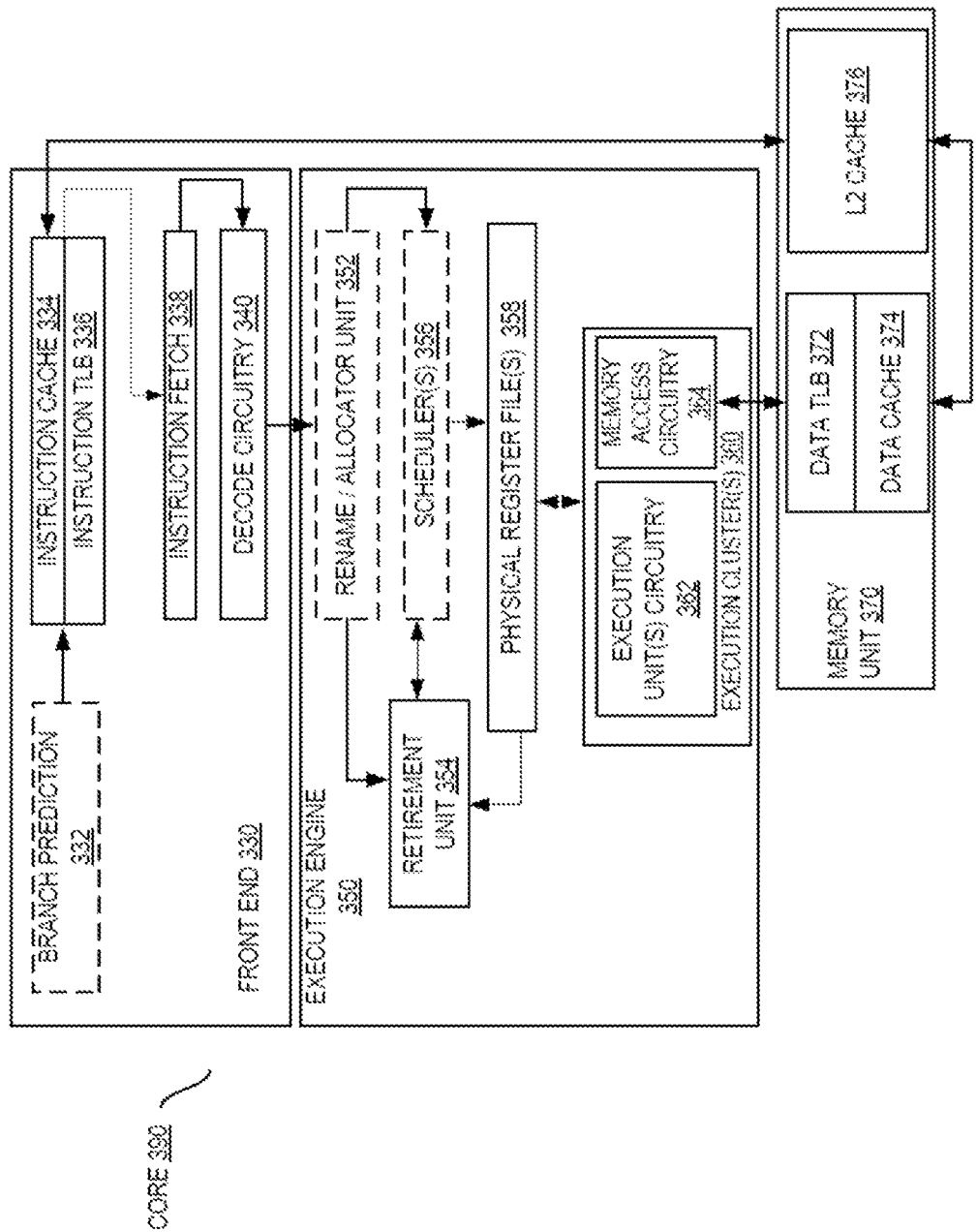
FIG. 3B illustrates details of one embodiment of a core.

FIG. 3(A) is a block diagram illustrating both an exemplary in-order pipeline and an exemplary register renaming, out-of-order issue/execution pipeline according to embodiments of the invention. FIG. 3(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 3(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 3(A), a processor pipeline 300 includes a fetch stage 302, an optional length decode stage 304, a decode stage 306, an optional allocation stage 308, an optional renaming stage 310, a scheduling (also known as a dispatch or issue) stage 312, an optional register read/memory read stage 314, an execute stage 316, a write back/memory write stage 318, an optional exception handling stage 322, and an optional commit stage 324. One or more operations can be performed in each of these processor pipeline stages. For example, during the fetch stage 302, one or more instructions are fetched from instruction memory, during the decode stage 306, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 306 and the register read/memory read stage 314 may be combined into one pipeline stage. In one embodiment, during the execute stage 316, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 300 as follows: 1) the instruction fetch 338 performs the fetch and length decoding stages 302 and 304; 2) the decode unit circuitry 340 performs the decode stage 306; 3) the rename/allocator unit circuitry 352 performs the allocation stage 308 and renaming stage 310; 4) the scheduler unit(s) circuitry 356 performs the schedule stage 312; 5) the physical register file(s) unit(s) circuitry 358 and the memory unit circuitry 370 perform the register read/memory read stage 314; the execution cluster 360 perform the execute stage 316; 6) the memory unit circuitry 370 and the physical register file(s) unit(s) circuitry 358 perform the write back/memory write stage 318; 7) various units (unit circuitry) may be involved in the exception handling stage 322; and 8) the retirement unit circuitry 354 and the physical register file(s) unit(s) circuitry 358 perform the commit stage 324.

FIG. 3(B) shows processor core 390 including front-end unit circuitry 330 coupled to an execution engine unit circuitry 350, and both are coupled to a memory unit circuitry 370. The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like.

The front end unit circuitry 330 may include branch prediction unit circuitry 332 coupled to an instruction cache unit circuitry 334, which is coupled to an instruction translation lookaside buffer (TLB) 336, which is coupled to instruction fetch unit circuitry 338, which is coupled to decode unit circuitry 340. In one embodiment, the instruction cache unit circuitry 334 is included in the memory unit circuitry 370 rather than the front-end unit circuitry 330. The decode unit circuitry 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 340 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM (not shown) or other medium that stores microcode for certain macroinstructions (e.g., in decode unit circuitry 340 or otherwise within the front end unit circuitry 330). In one embodiment, the decode unit circuitry 340 includes a micro-operation (micro-op) or operation cache (not shown) to hold/cache decoded operations, micro-tags, or micro-operations generated during the decode or other stages of the processor pipeline 300. The decode unit circuitry 340 may be coupled to rename/allocator unit circuitry 352 in the execution engine unit circuitry 350.

The execution engine circuitry 350 includes the rename/allocator unit circuitry 352 coupled to a retirement unit circuitry 354 and a set of one or more scheduler(s) circuitry 356. The scheduler(s) circuitry 356 represents any number of different schedulers, including reservations stations, central instruction window, etc. In some embodiments, the scheduler(s) circuitry 356 can include arithmetic logic unit (ALU) scheduler/scheduling circuitry, ALU queues, arithmetic generation unit (AGU) scheduler/scheduling circuitry, AGU queues, etc. The scheduler(s) circuitry 356 is coupled to the physical register file(s) circuitry 358. Each of the physical register file(s) circuitry 358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 358 includes vector registers unit circuitry, writemask registers unit circuitry, and scalar register unit circuitry. These register units may provide architectural vector registers, vector mask registers, general-purpose registers, etc. The physical register file(s) unit(s) circuitry 358 is overlapped by the retirement unit circuitry 354 (also known as a retire queue or a retirement queue) to illustrate various ways in which register renaming and out-of-order execution may be implemented (e.g., using a reorder buffer (s) (ROB(s)) and a retirement register file(s); using a future file(s), a history buffer(s), and a retirement register file(s); using a register maps and a pool of registers; etc.). The retirement unit circuitry 354 and the physical register file(s) circuitry 358 are coupled to the execution cluster(s) 360. The execution cluster(s) 360 includes a set of one or more execution units circuitry 362 and a set of one or more memory access circuitry 364. The execution units circuitry 362 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 356, physical register file(s) unit(s) circuitry 358, and execution cluster(s) 360 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 364). It should also be understood that where separate pipelines are used, one or more of these pipelines may be out-of-order issue/execution and the rest in-order.

In some embodiments, the execution engine unit circuitry 350 may perform load store unit (LSU) address/data pipelining to an Advanced Microcontroller Bus (AHB) interface (not shown), and address phase and writeback, data phase load, store, and branches.

The set of memory access circuitry 364 is coupled to the memory unit circuitry 370, which includes data TLB unit circuitry 372 coupled to a data cache circuitry 374 coupled to a level 2 (L2) cache circuitry 376. In one exemplary embodiment, the memory access units circuitry 364 may include a load unit circuitry, a store address unit circuit, and a store data unit circuitry, each of which is coupled to the data TLB circuitry 372 in the memory unit circuitry 370. The instruction cache circuitry 334 is further coupled to a level 2 (L2) cache unit circuitry 376 in the memory unit circuitry 370. In one embodiment, the instruction cache 334 and the data cache 374 are combined into a single instruction and data cache (not shown) in L2 cache unit circuitry 376, a level 3 (L3) cache unit circuitry (not shown), and/or main memory. The L2 cache unit circuitry 376 is coupled to one or more other levels of cache and eventually to a main memory.

The core 390 may support one or more instructions sets (e.g., the x86 instruction set (with some extensions that have been added with newer versions); the MIPS instruction set;

the ARM instruction set (with optional additional extensions such as NEON)), including the instruction(s) described herein. In one embodiment, the core 390 includes logic to support a packed data instruction set extension (e.g., AVX1, AVX2), thereby allowing the operations used by many multimedia applications to be performed using packed data.

Exemplary Execution Unit(s) Circuitry

Figure 4:
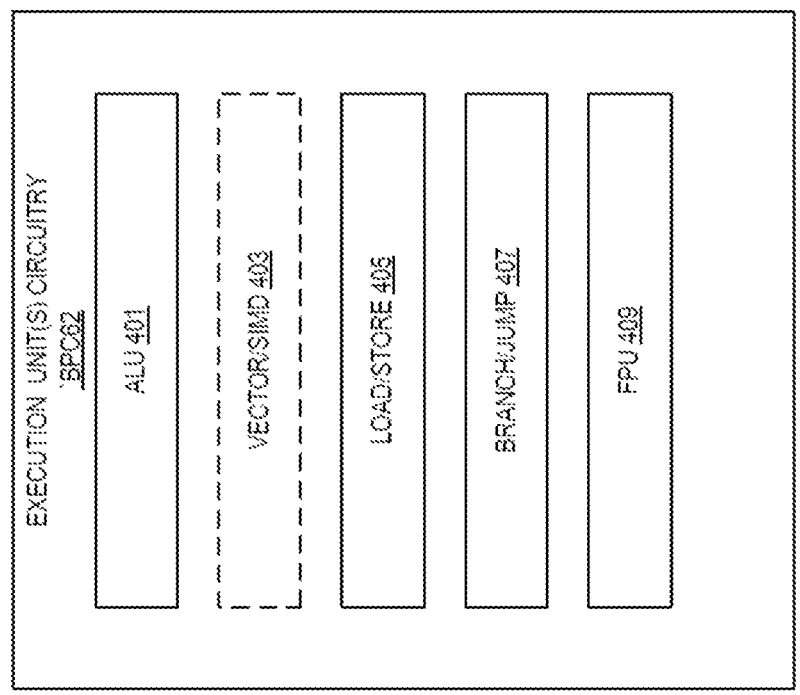
FIG. 4 illustrates execution circuitry in accordance with one embodiment.

FIG. 4 illustrates embodiments of execution unit(s) circuitry, such as execution unit(s) circuitry 362 of FIG. 3(B). As illustrated, execution unit(s) circuitry 362 may include one or more ALU circuits 401, vector/SIMD unit circuits 403, load/store unit circuits 405, and/or branch/jump unit circuits 407. ALU circuits 401 perform integer arithmetic and/or Boolean operations. Vector/SIMD unit circuits 403 perform vector/SIMD operations on packed data (such as SIMD/vector registers). Load/store unit circuits 405 execute load and store instructions to load data from memory into registers or store from registers to memory. Load/store unit circuits 405 may also generate addresses. Branch/jump unit circuits 407 cause a branch or jump to a memory address depending on the instruction. Floating-point unit (FPU) circuits 409 perform floating-point arithmetic. The width of the execution unit(s) circuitry 362 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 5:
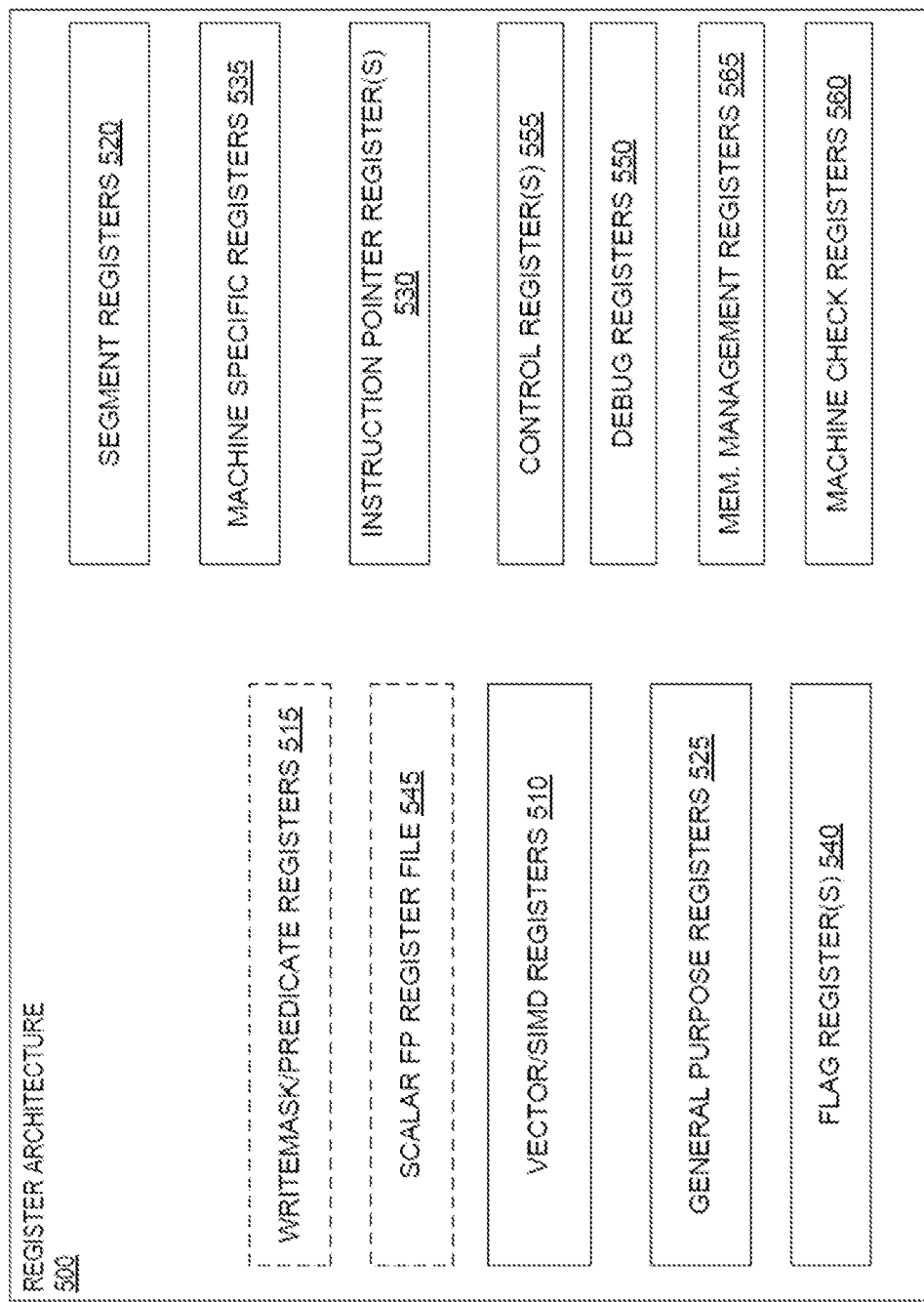
FIG. 5 illustrates one embodiment of a register architecture.

FIG. 5 is a block diagram of a register architecture 500 according to some embodiments. As illustrated, there are vector/SIMD registers 510 that vary from 128-bit to 1,024 bits width. In some embodiments, the vector/SIMD registers 510 are physically 512-bits and, depending upon the mapping, only some of the lower bits are used. For example, in some embodiments, the vector/SIMD registers 510 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 500 includes writemask/predicate registers 515. For example, in some embodiments, there are 8 writemask/predicate registers (sometimes called k0 through k7) that are each 16-bit, 32-bit, 64-bit, or 128-bit in size. Writemask/predicate registers 515 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 515 corresponds to a data element position of the destination. In other embodiments, the writemask/predicate registers 515 are scalable and consists of a set number of enable bits for a given vector element (e.g., 8 enable bits per 64-bit vector element).

The register architecture 500 includes a plurality of general-purpose registers 525. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 500 includes scalar floating-point register 545 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 540 (e.g., EFLAGS, RFLAGS, etc.) store status and control information for arithmetic, compare, and system operations. For example, the one or more flag registers 540 may store condition code information such as carry, parity, auxiliary carry, zero, sign, and overflow. In some embodiments, the one or more flag registers 540 are called program status and control registers.

Segment registers 520 contain segment points for use in accessing memory. In some embodiments, these registers are referenced by the names CS, DS, SS, ES, FS, and GS.

Machine specific registers (MSRs) 535 control and report on processor performance. Most MSRs 535 handle system-related functions and are not accessible to an application program. Machine check registers 560 consist of control, status, and error reporting MSRs that are used to detect and report on hardware errors.

One or more instruction pointer register(s) 530 store an instruction pointer value. Control register(s) 555 (e.g., CR0-CR4) determine the operating mode of a processor (e.g., processor 170, 180, 138, 115, and/or 200) and the characteristics of a currently executing task. Debug registers 550 control and allow for the monitoring of a processor or core's debugging operations.

Memory management registers 565 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 6:
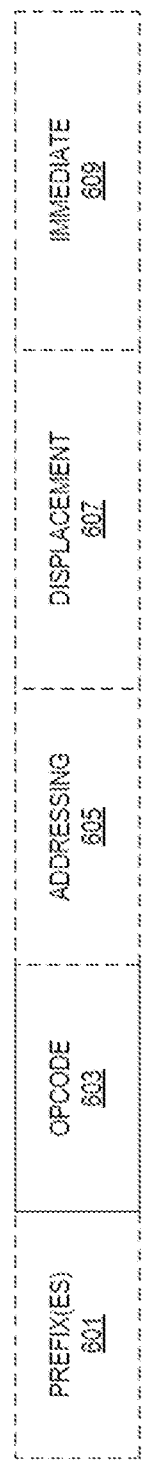
FIG. 6 illustrates one example of an instruction format.

FIG. 6 illustrates embodiments of an instruction format. As illustrated, an instruction may include multiple components including, but not limited to, one or more fields for: one or more prefixes 601, an opcode 603, addressing information 605 (e.g., register identifiers, memory addressing information, etc.), a displacement value 607, and/or an immediate 609. Note that some instructions utilize some or all of the fields of the format whereas others may only use the field for the opcode 603. In some embodiments, the order illustrated is the order in which these fields are to be encoded, however, it should be appreciated that in other embodiments these fields may be encoded in a different order, combined, etc.

The prefix(es) field(s) 601, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 603 is used to at least partially define the operation to be performed upon a decoding of the instruction. In some embodiments, a primary opcode encoded in the opcode field 603 is 1, 2, or 3 bytes in length. In other embodiments, a primary opcode can be a different length. An additional 3-bit opcode field is sometimes encoded in another field.

Figure 7:
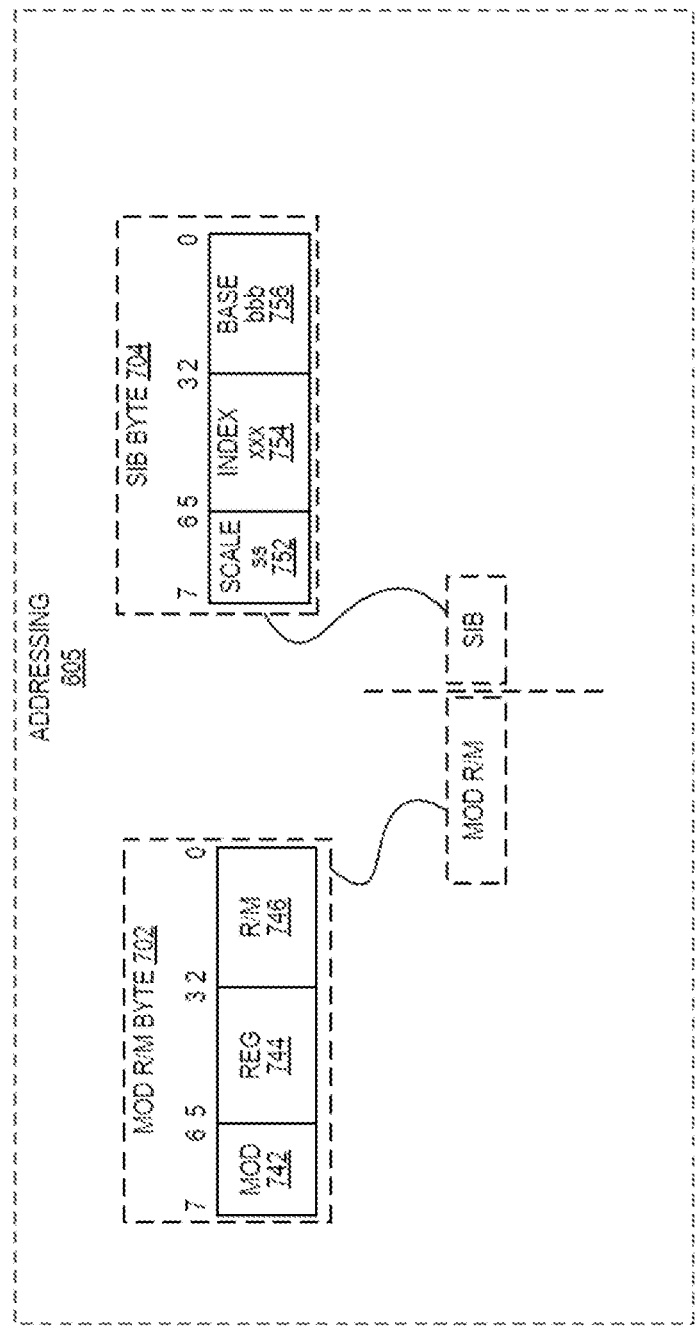
FIG. 7 illustrates addressing techniques in accordance with one embodiment.

The addressing field 605 is used to address one or more operands of the instruction, such as a location in memory or one or more registers. FIG. 7 illustrates embodiments of the addressing field 605. In this illustration, an optional ModR/M byte 702 and an optional Scale, Index, Base (SIB) byte 704 are shown. The ModR/M byte 702 and the SIB byte 704 are used to encode up to two operands of an instruction, each of which is a direct register or effective memory address. Note that each of these fields are optional in that not all instructions include one or more of these fields. The MOD R/M byte 702 includes a MOD field 742, a register field 744, and R/M field 746.

The content of the MOD field 742 distinguishes between memory access and non-memory access modes. In some embodiments, when the MOD field 742 has a value of b11, a register-direct addressing mode is utilized, and otherwise register-indirect addressing is used.

The register field 744 may encode either the destination register operand or a source register operand, or may encode an opcode extension and not be used to encode any instruction operand. The content of register index field 744, directly or through address generation, specifies the locations of a source or destination operand (either in a register or in memory). In some embodiments, the register field 744 is supplemented with an additional bit from a prefix (e.g., prefix 601) to allow for greater addressing.

The R/M field 746 may be used to encode an instruction operand that references a memory address, or may be used to encode either the destination register operand or a source register operand. Note the R/M field 746 may be combined with the MOD field 742 to dictate an addressing mode in some embodiments.

The SIB byte 704 includes a scale field 752, an index field 754, and a base field 756 to be used in the generation of an address. The scale field 752 indicates scaling factor. The index field 754 specifies an index register to use. In some embodiments, the index field 754 is supplemented with an additional bit from a prefix (e.g., prefix 601) to allow for greater addressing. The base field 756 specifies a base register to use. In some embodiments, the base field 756 is supplemented with an additional bit from a prefix (e.g., prefix 601) to allow for greater addressing. In practice, the content of the scale field 752 allows for the scaling of the content of the index field 754 for memory address generation (e.g., for address generation that uses $2^{scale}*$index+ base).

Some addressing forms utilize a displacement value to generate a memory address. For example, a memory address may be generated according to $2^{scale}*$index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 607 provides this value. Additionally, in some embodiments, a displacement factor usage is encoded in the MOD field of the addressing field 605 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 607.

In some embodiments, an immediate field 609 specifies an immediate for the instruction. An immediate may be encoded as a 1-byte value, a 2-byte value, a 4-byte value, etc.

FIG. 8 illustrates embodiments of a first prefix 601(A). In some embodiments, the first prefix 601(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 601(A) may specify up to three registers using 3-bit fields depending on the format: 1) using the reg field 744 and the R/M field 746 of the Mod R/M byte 702; 2) using the Mod R/M byte 702 with the SIB byte 704 including using the reg field 744 and the base field 756 and index field 754; or 3) using the register field of an opcode.

In the first prefix 601(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 744 and MOD R/M R/M field 746 alone can each only address 8 registers.

In the first prefix 601(A), bit position 2 (R) may an extension of the MOD R/M reg field 744 and may be used to modify the ModR/M reg field 744 when that field encodes a general purpose register, a 64-bit packed data register (e.g., a SSE register), or a control or debug register. R is ignored when Mod R/M byte 702 specifies other registers or defines an extended opcode.

Bit position 1 (X) X bit may modify the SIB byte index field 754.

Bit position B (B) B may modify the base in the Mod R/M R/M field 746 or the SIB byte base field 756; or it may modify the opcode register field used for accessing general purpose registers (e.g., general purpose registers 525).

FIGS. 9(A)-(D) illustrate embodiments of how the R, X, and B fields of the first prefix 601(A) are used. FIG. 9(A) illustrates R and B from the first prefix 601(A) being used to extend the reg field 744 and R/M field 746 of the MOD R/M byte 702 when the SIB byte 7 04 is not used for memory addressing. FIG. 9(B) illustrates R and B from the first prefix 601(A) being used to extend the reg field 744 and R/M field 746 of the MOD R/M byte 702 when the SIB byte 7 04 is not used (register-register addressing). FIG. 9(C) illustrates R, X, and B from the first prefix 601(A) being used to extend the reg field 744 of the MOD R/M byte 702 and the index field 754 and base field 756 when the SIB byte 7 04 being used for memory addressing. FIG. 9(D) illustrates B from the first prefix 601(A) being used to extend the reg field 744 of the MOD R/M byte 702 when a register is encoded in the opcode 603.

Figure 10A:
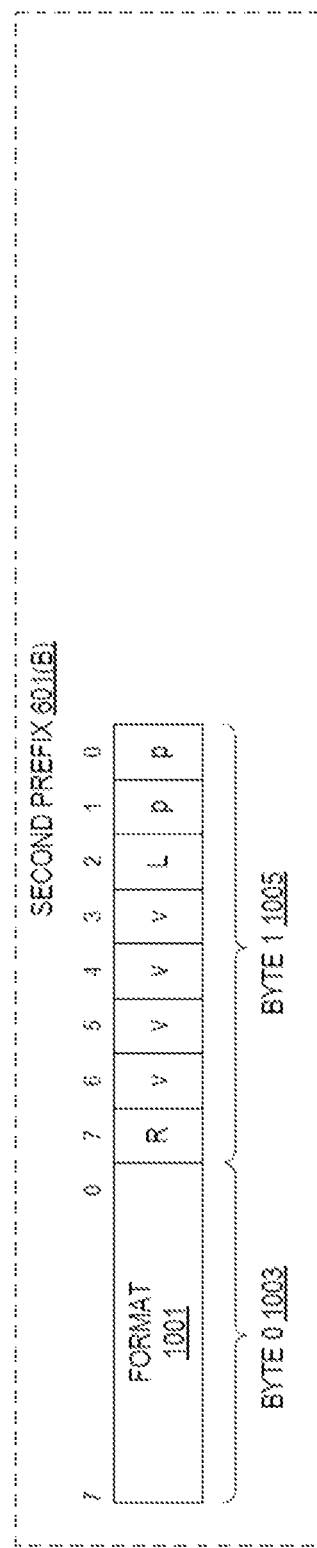
FIGS. 10A-B illustrate examples of a second instruction prefix.
Figure 10B:
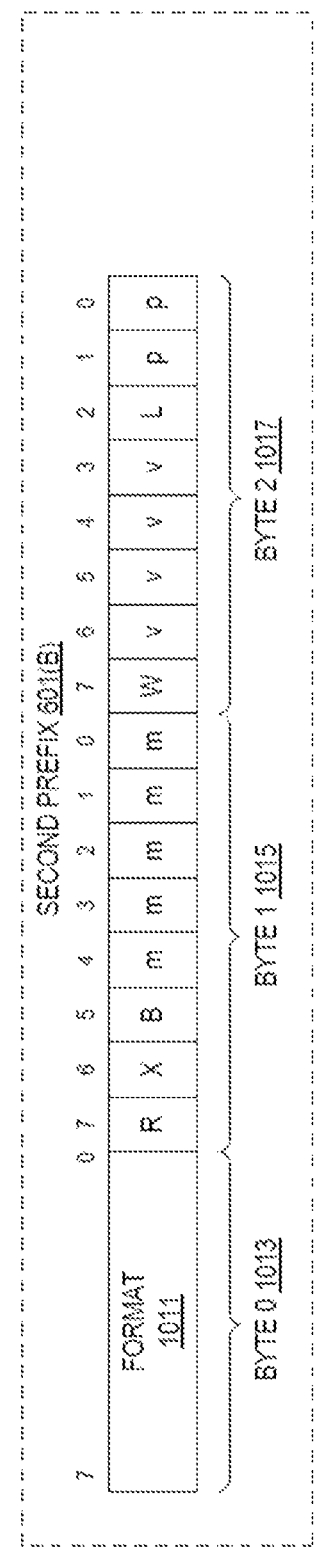

FIGS. 10(A)-(B) illustrate embodiments of a second prefix 601(B). In some embodiments, the second prefix 601(B) is an embodiment of a VEX prefix. The second prefix 601(B) encoding allows instructions to have more than two operands, and allows SIMD vector registers (e.g., vector/SIMD registers 510) to be longer than 64-bits (e.g., 128-bit and 256-bit). The use of the second prefix 601(B) provides for three-operand (or more) syntax. For example, previous two-operand instructions performed operations such as A=A+B, which overwrites a source operand. The use of the second prefix 601(B) enables operands to perform nondestructive operations such as A=B+C.

In some embodiments, the second prefix 601(B) comes in two forms—a two-byte form and a three-byte form. The two-byte second prefix 601(B) is used mainly for 128-bit, scalar, and some 256-bit instructions; while the three-byte second prefix 601(B) provides a compact replacement of the first prefix 601(A) and 3-byte opcode instructions.

FIG. 10(A) illustrates embodiments of a two-byte form of the second prefix 601(B). In one example, a format field 1001 (byte 0 1003) contains the value C5H. In one example, byte 1 1005 includes a "R" value in bit[7]. This value is the complement of the same value of the first prefix 601(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746 and the Mod R/M reg field 744 encode three of the four operands. Bits[7:4] of the immediate 609 are then used to encode the third source register operand.

FIG. 10(B) illustrates embodiments of a three-byte form of the second prefix 601(B). in one example, a format field 1011 (byte 0 1013) contains the value C4H. Byte 1 1015 includes in bits[7:5] "R," "X," and "B" which are the complements of the same values of the first prefix 601(A). Bits[4:0] of byte 1 1015 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1017 is used similar to W of the first prefix 601(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746, and the Mod R/M reg field 744 encode three of the four operands. Bits[7:4] of the immediate 609 are then used to encode the third source register operand.

Figure 11:
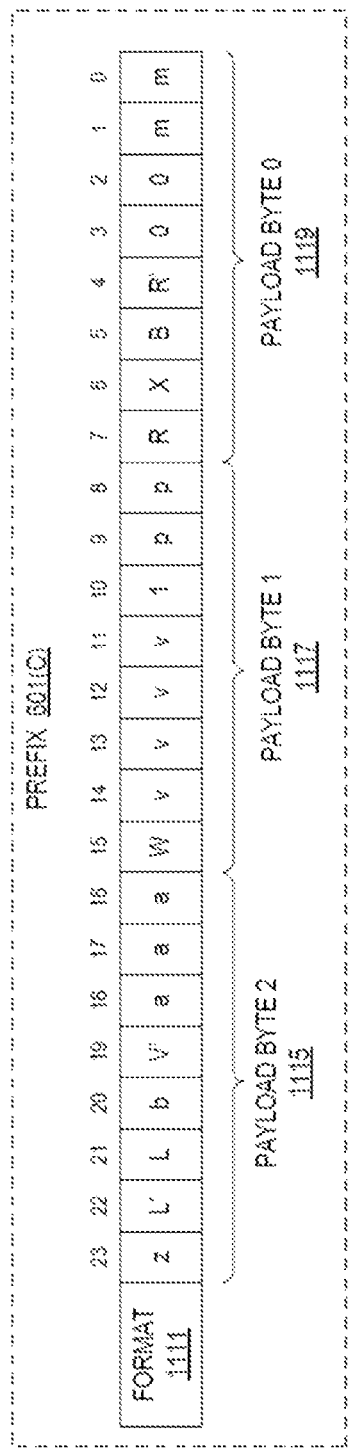
FIG. 11 illustrates payload bytes of one embodiment of an instruction prefix.

FIG. 11 illustrates embodiments of a third prefix 601(C). In some embodiments, the first prefix 601(A) is an embodiment of an EVEX prefix. The third prefix 601(C) is a four-byte prefix.

The third prefix 601(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 5) or predication utilize this prefix. Opmask register allow for conditional processing or selection control. Opmask instructions, whose source/destination operands are opmask registers and treat the content of an opmask register as a single value, are encoded using the second prefix 601(B).

The third prefix 601(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 601(C) is a format field 1111 that has a value, in one example, of 62H. Subsequent bytes are referred to as payload bytes 1115-1119 and collectively form a 24-bit value of P[23:0] providing specific capability in the form of one or more fields (detailed herein).

In some embodiments, P[1:0] of payload byte 1119 are identical to the low two mmmmm bits. P[3:2] are reserved in some embodiments. Bit P[4] (R') allows access to the high 16 vector register set when combined with P[7] and the ModR/M reg field 744. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 744 and ModR/M R/M field 746. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 601(A) and second prefix 611(B) and may serve as an opcode extension bit or operand size promotion.

P[18:16] specify the index of a register in the opmask (writemask) registers (e.g., writemask/predicate registers 515). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 601(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/MR/M | GPR, Vector | 1st Source or Destination |
| BASE | 0 | B | ModR/MR/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
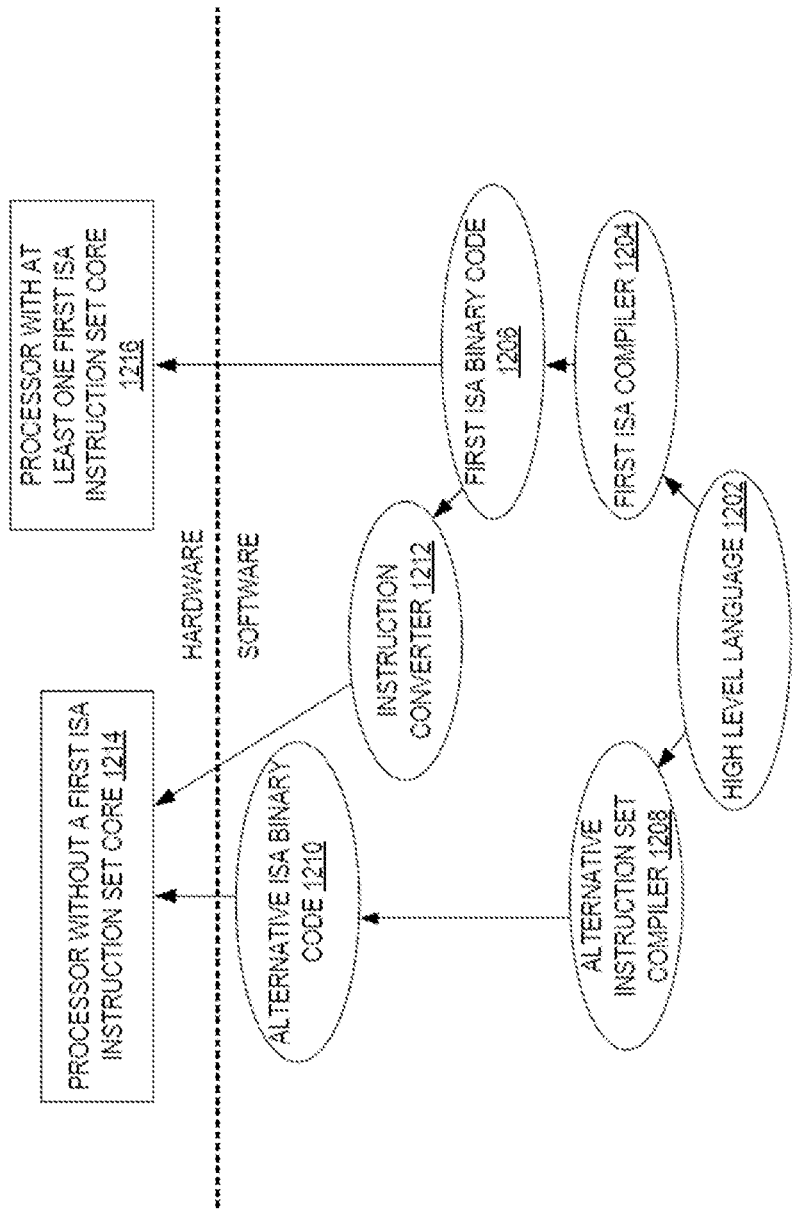
FIG. 12 illustrates instruction conversion and binary translation implementations.

FIG. 12 illustrates a block diagram contrasting the use of a software instruction converter to convert binary instructions in a source instruction set to binary instructions in a target instruction set according to certain implementations. In the illustrated embodiment, the instruction converter is a software instruction converter, although alternatively the instruction converter may be implemented in software, firmware, hardware, or various combinations thereof. FIG. 12 shows a program in a high level language 1202 may be compiled using a first ISA compiler 1204 to generate first ISA binary code 1206 that may be natively executed by a processor with at least one first instruction set core 1216. The processor with at least one first ISA instruction set core 1216 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1204 represents a compiler that is operable to generate first ISA binary code 1206 (e.g., object code) that can, with or without additional linkage processing, be executed on the processor with at least one first ISA instruction set core 1216.

Similarly, FIG. 12 shows the program in the high level language 1202 may be compiled using an alternative instruction set compiler 1208 to generate alternative instruction set binary code 1210 that may be natively executed by a processor without a first ISA instruction set core 1214. The instruction converter 1212 is used to convert the first ISA binary code 1206 into code that may be natively executed by the processor without a first ISA instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have a first ISA instruction set processor or core to execute the first ISA binary code 1206.

In different embodiments, a device may service or otherwise support multiple clients. However, the scalability of a device may be limited by its capability to maintain information about each of the different clients that it is servicing, which in turn may be limited by the silicon die area or other space available to store such information. For example, a single-root input/output virtualization (SR-IOV) device, as defined by the Peripheral Component Interconnect Express (PCIe) specification, can implement a larger number of virtual functions (VFs) to support a larger number of clients. A device can also implement a larger number of queues and associated client-specific state to support a larger number of clients.

Figure 13:
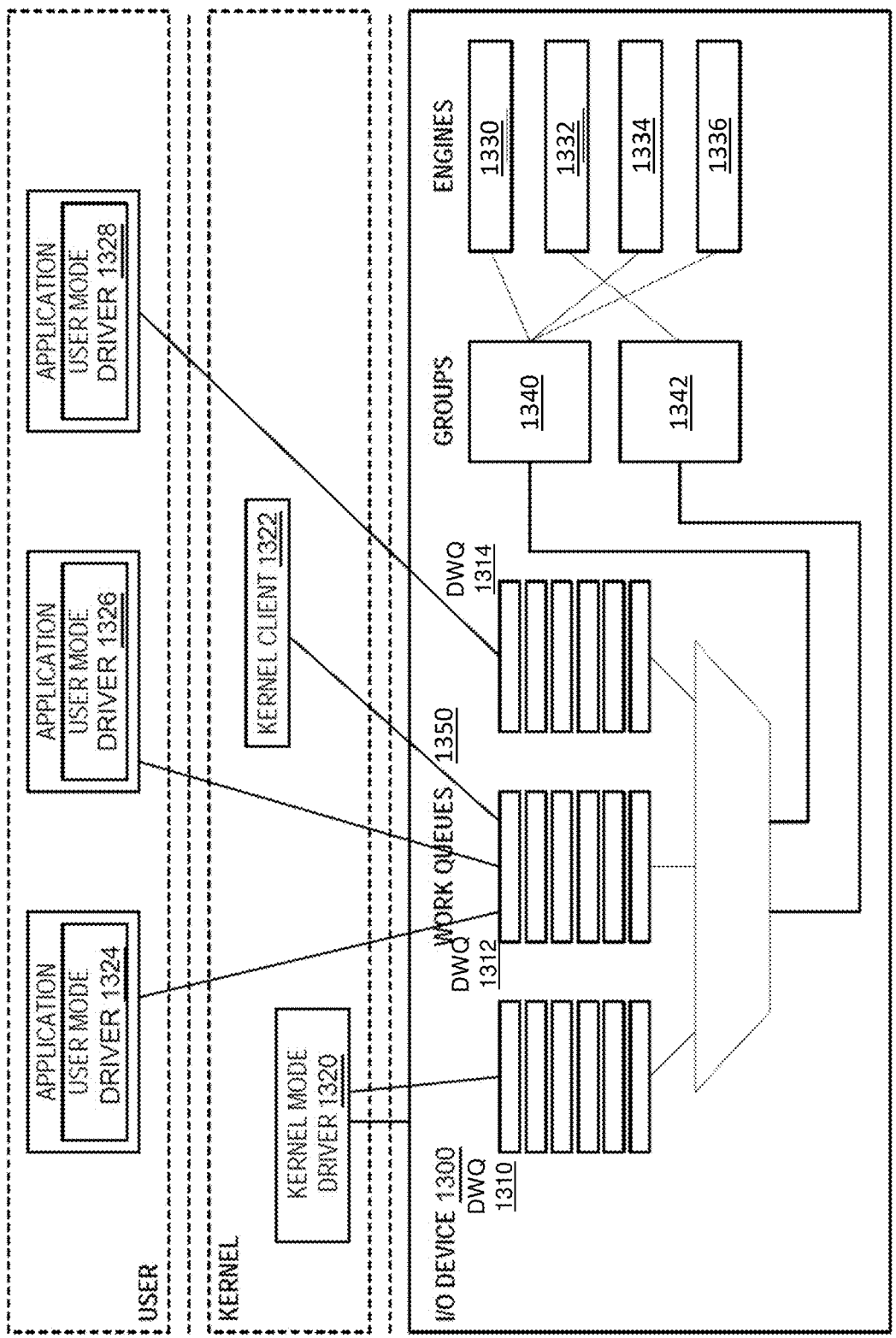
FIG. 13 illustrates a scalable device according to an embodiment of the invention.

FIG. 13 illustrates one embodiment of a scalable device 100 which may be implemented in logic gates, storage elements, and/or any other type of circuitry, all or parts of which may be included in a discrete component and/or integrated into the circuitry of a processing device or any other apparatus in a computer or other information processing system. For example, device 1300 in FIG. 13 may correspond to coprocessor 138 in FIG. 1 or special purpose logic 208 in FIG. 2.

A scalable device according to one embodiment may use any number of work queues 1350, where a work queue is a data structure to be used to accept work from clients. A work queue may be a dedicated work queue (DWQ) that may accept work from a single client or a shared work queue (SWQ) that may accept work from multiple clients. For example, device 1300 is shown as including DWQs 1310 and 1314 and SWQ 1312, which may accept work from clients 1320, 1322, 1324, 1326, and 1328.

A work queue may be implemented using memory within the device (e.g., device 1300) and/or using memory not within the device (e.g., host memory, system memory, registers or other storage locations not within the device). Using host memory, for example, a work queue 1350 may be implemented with a base register, a head register, and a tail register that are writable by software to inform the device about work submission. Using device memory, for example, a work queue 1350 may be implemented with an address to which software may write to submit work.

Work queues 1350 may be used to store work descriptors that include a client identifier (ID) and privileges. The client ID is to identify the client (e.g., with a process address space identifier (PASID)) and the privileges indicate the privileges that the device may use to identify the address domain and privileges of the client. Work descriptors may be populated by trusted hardware (e.g., a CPU in a secured environment) and/or trusted software (an operating system (OS) running on a CPU in a secured environment) to ensure that they cannot be spoofed by unprivileged clients.

In various implementations, work descriptors are fully self-describing so that the device does not need to retain any client-specific state, and thus does not require additional memory to support additional clients. A fully self-describing work descriptor contains all the information needed to perform the work requested.

For example, a work descriptor in an embodiment may include a pointer to a completion record in host memory where completion status (including any error status) is to be written. A completion record may also contain any partial results that a subsequent work descriptor may use, so that data may be carried forward through operations (e.g., a cyclic redundancy check computation may use the result from each step as an input to the next step). A completion record may also contain flag bits and/or any other information that may be used in performing operations. Therefore, no memory within the device will be used to store per-client state regarding completion status, partial results, flag bits, etc.

In various implementations, work descriptors may also be used to avoid other limits on the scalability of the device. For example, limiting the number of clients to one per messaged-signaled interrupt in a PCI MSI-X table in the device may be avoided according to either of the following approaches. According to either approach, any client may be set up with multiple interrupts so that the client can choose to specify different interrupts for different descriptors, thus allowing the client to perform interrupt rebalancing without involving OS or other system software.

In an embodiment, a work descriptor may be designed to include interrupt message information (e.g., MSI address and data) passed in by the client. Since the interrupt message is provided by the client, it is untrusted, so interrupt remapping hardware (e.g., an I/O memory management unit) may be responsible for ensuring that a client cannot request an interrupt that is not assigned to it. For example, a PASID along with a remappable interrupt message may be used to locate an Interrupt Remapping Table Entry for the interrupt message (PASID granular interrupt remapping). PASID granular interrupt remapping allows the same message to have different meanings when used in conjunction with different PASIDs, and it also allows system software to control which interrupt messages may be used by each client (as identified by the client's PASID). Then, the device can use the interrupt message information from the work descriptor to generate the interrupt when it is done with the operation, while avoiding storing interrupt messages in the device.

In an embodiment, a work descriptor may be designed to include an interrupt handle (instead of the full MSI address and data values). The interrupt handle in the descriptor designates an entry in an interrupt message table. The device may implement the interrupt message table in host memory, with each interrupt table entry containing the MSI address and data. Since the interrupt message table is in host memory rather than device memory, it can be made large enough to support any number of clients. The interrupt handle in the work descriptor may be used by the device to index into the interrupt table to identify the MSI address and data values for generating the interrupt when the device is done with the operation. The device will first validate the interrupt handle using the PASID to ensure the client is allowed to use the specific interrupt handle. The device may validate the interrupt handle by using PASID granular interrupt message tables or by including the PASID in the interrupt table entry during interrupt setup and generation, matching the entry's PASID against client's PASID. To avoid reading interrupt table entries from host memory on every descriptor, an interrupt message cache within the device may cache frequently used interrupt entries.

In addition to reducing or eliminating per-client state on the device, certain embodiments provide for efficiently processing work from many clients. Embodiments may allow prioritization of work from time-sensitive clients while ensuring forward-progress on work from other clients. Embodiments may prevent errors or performance issues due to some clients from negatively affecting other clients.

A work submission portal is a means by which clients may submit work requests to a device. In an embodiment, an SWQ may have more than one work submission portal to which clients may submit work, rather than a single work submission portal mapped to all clients using the SWQ. The use of a single work submission portal per SWQ may cause clients to keep retrying work submissions because they experience the SWQ as full, which may make the use of the device difficult and unpredictable for other clients. In contrast, the use of multiple work submission queues per SWQ according to certain embodiments may provide for prioritization of work requests and prevention of starvation of some clients. In embodiments, work submission portals may be implemented as memory mapped I/O (MMIO) addresses to which clients may write to submit work requests, so multiple work submission portals may be provided by assigning more than one MMIO address to an SWQ and providing different MMIO addresses to different clients, which does not require additional logic circuitry or storage in the device.

In various embodiments, different work submission portals for an SWQ may have different characteristics, such as different work acceptance priorities for different clients. For example, an SWQ may have a first submission portal designated as a limited portal and a second submission portal designated as an unlimited portal. The SWQ may have a configurable threshold that may be used to reserve some entries exclusively for work submitted through the unlimited portal. For example, the SWQ may be configured to use only up to 80% (threshold) of the SWQ space for work submitted through the limited portal, while work submitted through the unlimited portal may use 100% of the SWQ space. Then, privileged software (e.g., the device driver) can map the limited portal to user space clients and keep the unlimited portal for itself. If user space clients experience an SWQ full condition (e.g., the SWQ returns 'Retry' to user space clients when the SWQ is 80% full), instead of continuously retrying work submission themselves, they can make a request to the device driver to submit the work descriptor on their behalf. The device driver can serialize requests from user space clients and use the unlimited portal to submit work requests. Since 20% of the SWQ space is reserved for the unlimited portal, the device driver's work submission will likely succeed.

Embodiments may also provide for handling situations in which the SWQ is 100% full (e.g., even the unlimited portal returns 'Retry'). In an embodiment, the device driver may respond to the client with 'Retry' as if 'Retry' had been received directly from the device. In an embodiment, the device driver may block the client until the work can be submitted, and the device driver may possibly schedule another client in the meantime. In an embodiment, the device driver may place the work descriptor in a software-defined work queue until it can be submitted to the device, but resume the client as if the work had been successfully submitted to the device. According to this latter approach, the client may continue operation while waiting for the device to catch up. Embodiments may provide for the use of this latter approach, by ensuring that all descriptors to the device are independent of each other with respect to ordering or by preventing the client from submitting any descriptors directly to the device that could be processed prior to the descriptor that was queued in software by the device driver. This prevention may be achieved by removing the device submission portal from the client's memory map so the client cannot submit work to the device directly or by locking the SWQ so that no clients can submit work. In this locking approach, all clients work submissions would return 'Retry' and clients would have to request the device driver to submit their work, which would provide fairness, but may also have high overhead because of the bottleneck of work submissions going through the device driver (which might be acceptable because it would only happen when the shared work queue is completely full).

Embodiments may also provide for configurability of the work queues themselves. For example, any or each of the multiple work queues may be configured, at run-time based on client requirements, as dedicated or shared. Work queues may be assigned different priorities and configured by software. The device may dispatch commands from higher priority work queues preferentially over commands from lower priority work queues without starving the lower priority work queues. Some clients may have access to multiple work queues, and thus have the ability to prioritize their own work, while other clients may have access to only a single work queue, thus fixing the priority of all work they submit.

Embodiments may also provide for alleviating a problem which occurs when a device is blocked because it is waiting for a response from another part of the system (e.g., completion of a memory read, translation of address, handling of page fault) while performing an operation. This problem is called head-of-line blocking, because the operation being performed in the device prevents other operations in line behind it from making progress.

In various embodiments, to alleviate head-of-line blocking, a device may include multiple operation components (engines) that can process individual work descriptors in parallel, such as engines 1330, 1332, 1334, and 1336. In an embodiment, one or more work queues may be grouped together with one or more engines. A device may support several groups, such as groups 1340 and 1342. Each work queue and each engine may be configured by software to be part of any one group. Work descriptors from one or more work queues in a group may be dispatched to any of the engines in that group. Thus, if one engine in a group is waiting for an external response while processing a descriptor from a work queue, other engines in the group may continue to process other work descriptors from the same or other work queues.

In an alternative embodiment, a device may implement an out-of-order processing engine, which may suspend a work descriptor that is waiting for an external response, and process other work descriptors in the meantime from the same or other work queues.

Furthermore, in various embodiments, a device may have internal resources (e.g., device internal memory) that engines use to process work descriptors from various clients. If these resources are limited, the device may prioritize (or provide QoS for) use of these resources by different clients to ensure that work descriptors (e.g., relatively large or time-consuming ones) from one or a few clients do not consume most or all internal resources, thereby affecting the processing of other clients and overall performance of the device. The prioritization may be done using a credit-based system in which credits represent the internal resources. Credits may be assigned to groups, individual work queues, or individual engines to control the number of resources each group, work queue, or engine is allowed to use to process its work descriptors. In an embodiment, a device may define two credit thresholds for each group, work queue, or engine: a first threshold to specify a minimum number of credits reserved for a group, work queue, or engine (minimum guaranteed or reserved credits), and a second threshold to specify a maximum number of credits allowed for a group, work queue, or engine (maximum allowed credits).

Embodiments may also provide for efficient handling of page faults. If a device supports virtual memory (e.g., shared virtual memory (SVM) or I/O virtual addresses (IOVA)), the addresses given to the device in work descriptors are not guaranteed to be mapped in physical memory. Before accessing host memory (e.g., through direct memory access (DMA)), the device may request address translation from an I/O memory management unit (IOMMU), using, for example, the Address Translation Services described in the PCIe specification. The IOMMU walks the address translation tables and, if a translation is present, returns the translated physical address to the device so that the device can access the data in memory. However, if the virtual address is not currently present in main memory, the result will be a translation error (an I/O page fault). A page fault may also occur when a page is present, but the processor or device does not have rights to perform the type of access requested (e.g., a device attempts to write to a read-only page).

Figure 14:
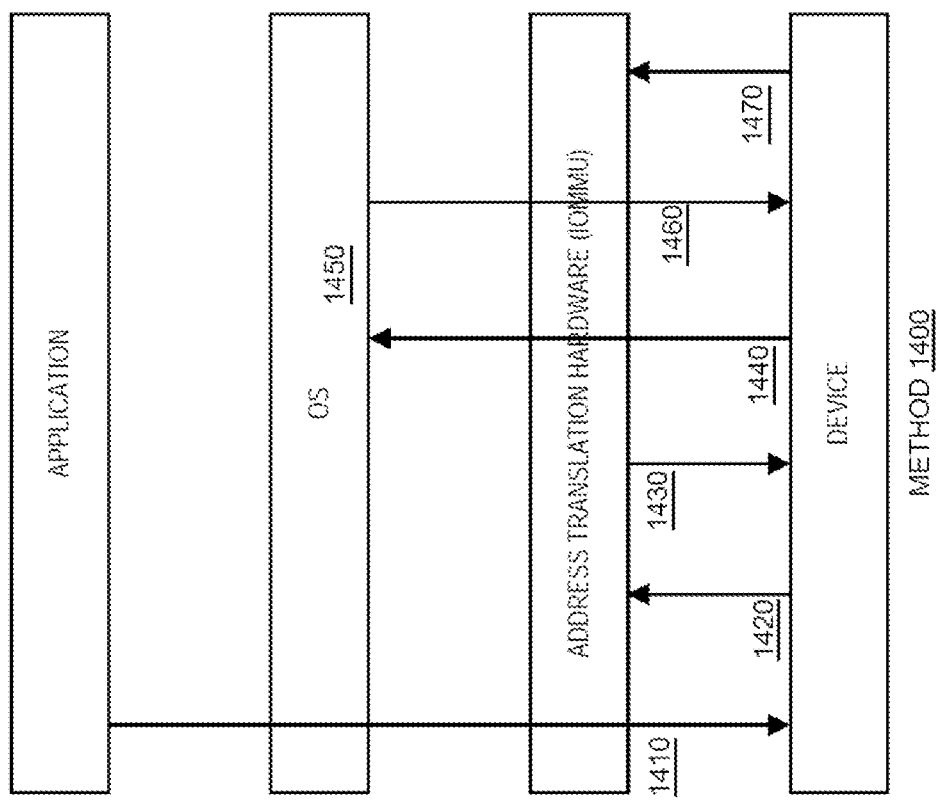
FIG. 14 illustrates an example of a method for handling a page fault.

When a device encounters a page fault, it cannot handle the page fault itself because the memory management system software does not run on the device. Therefore, according to a method (1400) illustrated in FIG. 14, after the application submits a command to the device (1410), the device attempts to access the page (1420), and the IOMMU responds with a page fault (1430), the device sends a page fault notification through the IOMMU to the OS (1440) and blocks the descriptor processing until the page fault is resolved. After resolving the page fault (1450), the OS responds back to the device, through the IOMMU, that the page is available (1460). Then, the device attempts to re-access the page, and this time the access is successful (1470).

A device typically implements a limited number of simultaneous outstanding I/O page fault notifications to the OS. Hence, when supporting a large number of clients, the device may encounter many page faults and may usually be waiting for at least one page fault to be resolved, which will significantly reduce the performance of the device.

Figure 15:
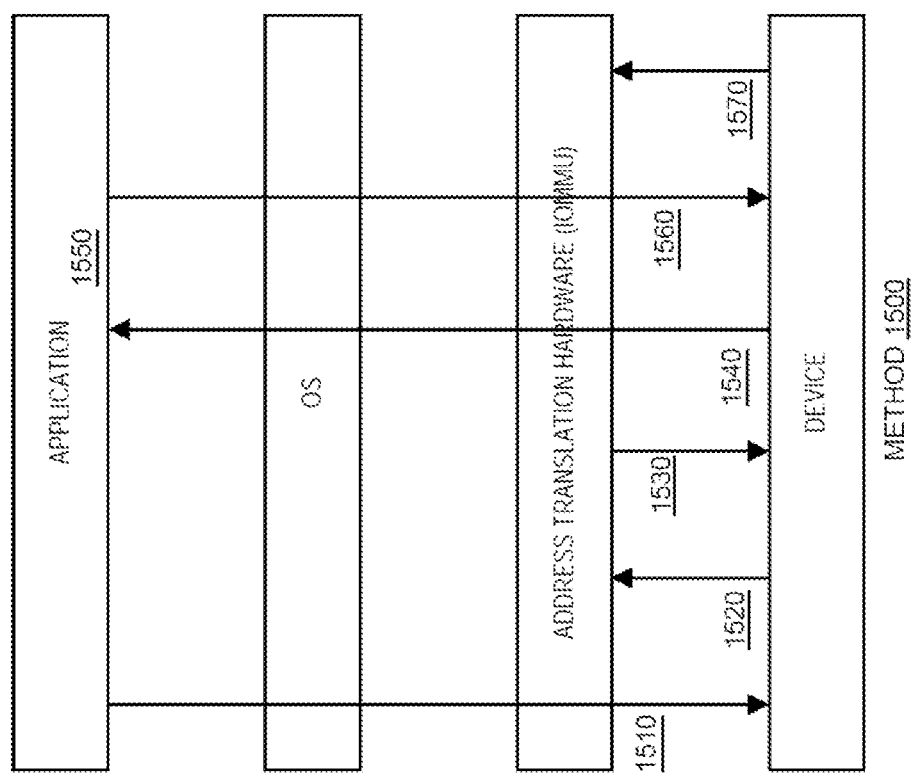
FIG. 15 illustrates another example of a method for handling a page fault according to an embodiment of the invention.

Therefore, instead of blocking on an I/O page fault, some implementations, such as method 1500 in FIG. 15, may include (after the application submits a command to the device (1510), the device attempts to access the page (1520), and the IOMMU responds with a page fault (1530)), the device directly notifying the client about a page fault (1540) and terminate processing of the work descriptor that caused the page fault. Then, the device may continue processing other work descriptors without blocking while the application may resolve or otherwise respond to (as described below) the page fault (1550). After the page fault is resolved, the application may resubmit the command to the device (1560) and the device may attempt to re-access the page (1570).

According to embodiments such as method 1500, page fault handing may be left to the client. For example, the client application may request the OS to resolve the page fault (e.g., by accessing the faulting pages) and resubmit a work descriptor to resume the work after the page fault is resolved. Alternatively, the client may decide to complete the remaining work using some other method instead of using the device, such as by using the CPU to perform the operation.

The mechanism used by the device to notify the application that it has encountered a page fault is called partial completion. In embodiments including partial completion, the device may report completion of the operation to the client in the normal way (e.g., by setting a device register, modifying the tail pointer of a queue or ring buffer, writing to a shared memory location, generating an interrupt, or any combination of these), but the completion record information may include the following additional elements: a status field indicating that a page fault was encountered, an indication of how much of the operation completed prior to the page fault, the virtual address that could not be translated, an indication of whether the device intended to read or write to the address that could not be translated, and any other information needed by software to resume the operation (see examples below).

As implied by the name, partial completion means that the device may have performed part of the requested operation prior to encountering the page fault. By reporting partial completion to the client, the client (e.g., application software) may begin using the results that have been completed, even while the page fault is being resolved and the remainder of the operation is being performed by the device.

In embodiments, a partial completion may report that none of the operation has been completed, if, for example, the device encounters a page fault on the first page that is needed to begin the operation.

In embodiments, depending on the type, length, and complexity of the operation, the device may restart the operation from the beginning rather than resume from the point where it encountered the page fault. In this case, the device may report that none of the operation has completed, even when the page fault was not on the first page (assuming that the partially completed operation has not overwritten any of its inputs).

In embodiments, the partial completion information includes all information required to resume the operation. The client may resume the operation by submitting a new command that starts where the previous operation stopped. For operations that carry forward data throughout the operation (e.g., CRC computation), if a page fault is encountered part-way through the operation, the intermediate result is retained for use when the operation is resumed. The intermediate result may be saved in the completion record along with the page fault information. When the application resumes the operation after satisfying the page fault, it passes the intermediate result along with the command to resume the operation.

Method and Apparatus for High-Performance Page-Fault Handling for Multi-Tenant Scalable Accelerators Accelerators are frequently configured to use shared virtual memory (SVM), which provides a ubiquitous programming model between the host/CPU and accelerator offloads. At the same time, there has been a rapid growth in highly multi-tenanted (VM or containers) environments, making it challenging to support SVM and I/O page-faults in these environments.

Accelerator modes such as SVM Block-on-Fault and SVM Fault-and-Stream have been used to address these limitations. With SVM Block-on-Fault, the accelerator/engine blocks until the I/O page-fault is resolved by the OS/VMM software and a response is returned to continue the remaining work. With SVM Fault-and-Stream, the Accelerator/Engine context switches to another offload-context while the I/O page-fault is resolved for given context.

These existing models suffer from various limitations. SVM Block-on-Fault has scaling and multi-tenant challenges. If the accelerator has only 4 engines, the I/O page-fault cannot scale beyond four concurrent clients or has noisy neighbor-related challenges with multi-tenancy (e.g. a page-fault from one tenant will delay offload execution for other tenants). SVM Fault-and-Stream has challenges with respect to the added device complexity and overheads associated with saving/restoring state. Moreover, previous techniques only support page-faults on data-buffers and not on the control structures.

The embodiments of the invention include techniques to support high-performance I/O page-fault handling for accelerator devices in highly multi-tenant and scalable environments, while keeping accelerator complexity and cost in check. In particular, the implementations described herein provide page-fault handling for accelerators which have per-work queue capability, directly notifying application/offload-clients about accelerator page-faults, and providing event-log mechanisms to allow the accelerator driver to proxy the page-fault handling/notification to offload clients (when direct notification is not feasible/recommended). In addition, some embodiments can prematurely complete the execution of a faulted context and immediately switch to the next context, allowing software to handle the page-fault and complete the remaining work either on the host processor (e.g., CPU) or by offloading again to the accelerator. In addition, extensions are described for handling batch descriptors.

These embodiments address scaling and complexity-related challenges, making VM live migration with assigned accelerators feasible and boosting performance of accelerator page-fault handling. Thus, the embodiments described herein make SVM usage more viable/practical in virtualized configurations.

Figure 16:
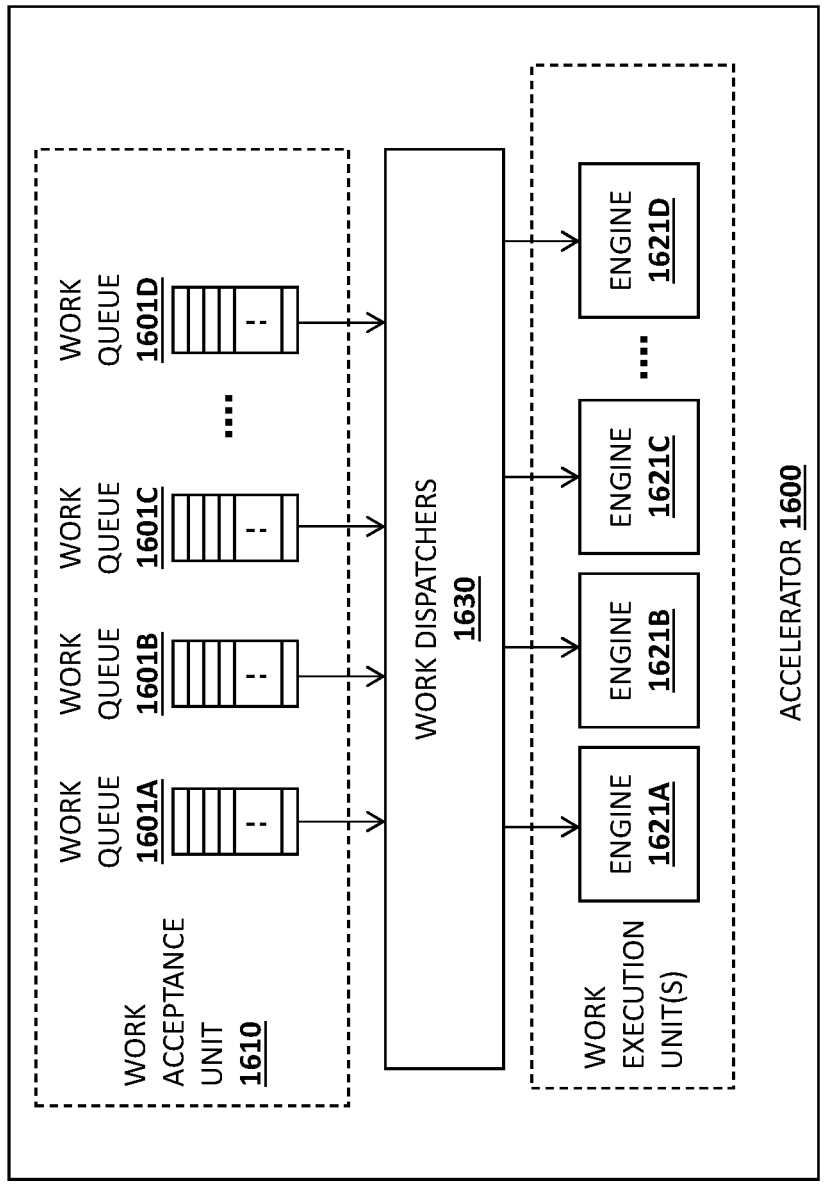
FIG. 16 illustrates an accelerator with a work acceptance unit, work dispatchers, and work execution units.

Referring to FIG. 16, one embodiment of an accelerator 1600 includes a work acceptance unit 1610 comprising a plurality of work queues (WQs) 1601A-D which may be arranged into groups based on workload characteristics as described above. A plurality of execution units, or "engines" 1621A-D are assigned to process work descriptors from one or more of the work queues 1601A-D. One or more work dispatchers 1630 dispatches the work specified in the descriptors from the work queues 1601A-D to the execution engines 1621A-D.

Execution engines 1621A-D are typically shared between multiple clients, which may be drivers, applications, virtual machines (VMs), containers, or any other functional software component. Resource sharing reduces the cost/burden of building independent engines for each client. The work queues 1601A-D funnel work to these engines 1621A-D and are either assigned to individual clients (e.g., the dedicated work queues 1310, 1314 in FIG. 13) or shared between them (e.g., the shared work queue 1312 in FIG. 13).

Figure 17:
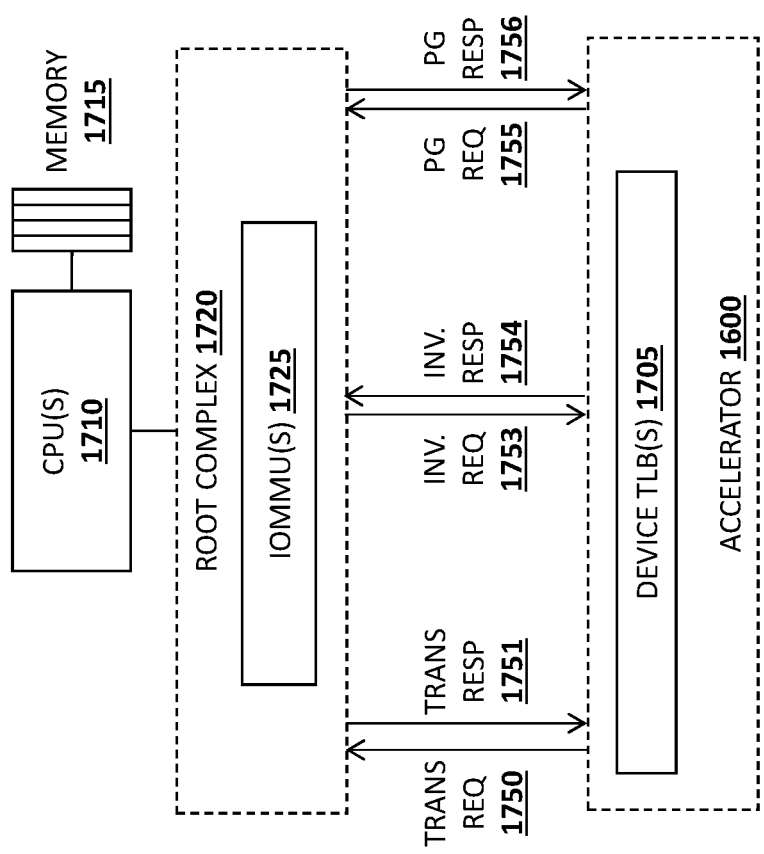
FIG. 17 illustrates transactions between an accelerator and a host root complex.

Referring to FIG. 17, in a shared virtual memory programming model, as part of processing a work-descriptor, the accelerator 1600 will attempt to acquire address translations associated with the addresses specified in the work-descriptors, for example, by using PCIe Address Translation Services. An accelerator 1600 may include a translation lookaside buffer 1705 to cache virtual-to-physical address translations. If a particular translation is not found in the TLB 1705, a translation request 1750 is sent to the IOMMU 1725 within a root complex 1720 of the host processor 1710. The IOMMU will retrieve the translation from its TLB or retrieve it from memory 1715 and will then transmit a translation response 1751 to the accelerator 1600 with the translation.

The IOMMU 1725 and accelerator 1600 must communicate to ensure that the TLB 1705 of the accelerator 1600 remains consistent with the TLB of the IOMMU 1725 and host processors 1710. Thus, in response to certain events such as the modification of translation entries or context switches, the IOMMU 1725 will transmit invalidation requests 1753 to the accelerator 1600 which will invalidate the relevant TLB entries and send back an invalidation acknowledgement response 1754 when complete.

In the event that a page is not present in the memory 1715 or if the permissions are insufficient to access the page, the translation request 1750 will generate a page-request 1755, for example, by using PCIe Page Request Services. Such a page-request is received by the IOMMU 1725 and passed on to system software (e.g., OS/VMM) to process an I/O page-fault. System software will fix the page-fault and return a successful page-response 1756 to the accelerator device via the IOMMU 1725. In the event that access to the page is denied, a page-response with a corresponding error is returned to the accelerator 1600.

During this sequence of operations, the accelerator 1600 (or engine of the accelerator) can stall the engine/execution until the I/O page-fault is processed (similar to how an application running on a core is stalled until a CPU page-fault is handled), referred to as "SVM Block-on-Fault Mode". Alternatively, the accelerator/engine can generate the page-request, save the current work-context and transition to the next work-descriptor, resuming work later once the page-fault is handled, referred to as "SVM Fault-and-Stream Mode".

As mentioned, Block-on-Fault mode has scaling and noisy neighbor related challenges. For example, in a scenario where 4 work queues associated with 4 different clients are mapped to an engine, a page-fault from one client will cause the engine to stall resulting in delayed execution for the other clients. This becomes even more of a problem with virtualized configurations, where page-fault handling latencies are higher and behavior of one VM/tenant will impact quality of service for other VMs/tenants sharing the same engine.

Fault-and-Stream mode attempts to address this stalling problem; however, it requires complex hardware that can support saving and restoring of workload context and has challenges with respect to cost/latencies associated with context switching and the save/restore operations.

Moreover, additional latencies and overheads are introduced with these traditional approaches for virtualized configurations, where the arrival of a page-fault will result in a virtual machine (VM) exit and will also require another VM exit for queuing the page-response. Additional challenges arise when supporting live-migration of VMs with assigned accelerator resources. For example, some VMMs pause virtual-processors first and then pause virtual-devices for VMs, which can result in a deadlock due to cyclic dependency.

Figure 18:
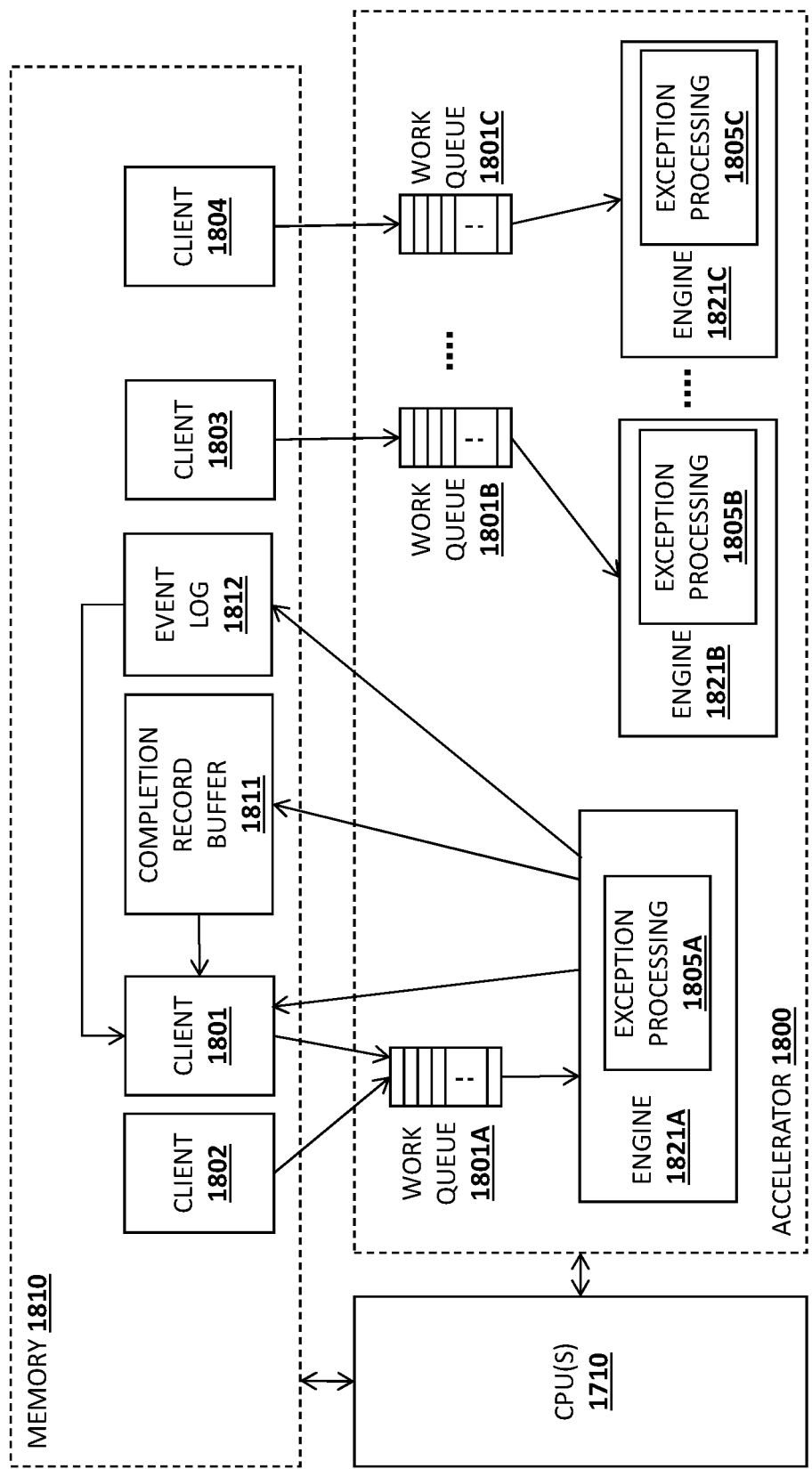
FIG. 18 illustrates an accelerator with fault processing logic in accordance with embodiments of the invention.

FIG. 18 illustrates an example of an accelerator 1800 on which embodiments of the invention may be implemented. A plurality of engines 1821A-C process descriptors from a plurality of work queues 1801A-C. The accelerator engines 1821A-C each include fault processing logic 1805A-C to respond to page fault conditions as described herein (although only illustrated for engine 1821A for simplicity). The engines 1821A-C may be any type of processing engine of an accelerator including, but not limited to, data copy engines, data compression engines, security engines, communications engines, and graphics engines.

In one implementation, instead of blocking on an I/O page fault until it is resolved, the fault processing logic 1805A directly notifies the client 1801 and terminates the work descriptor processing. This allows the engine 1821A to continue processing other work descriptors without blocking; the client 1801 then performs the page-fault handling, potentially via a driver, OS, or other privileged software. For example, a client application can then request the OS to resolve the page-fault (e.g., by accessing the faulting page) and resubmit a work descriptor to the work queue 1801A to resume the work after the page fault is resolved. Alternatively, the client application 1801 may decide to complete the remaining work using some other method instead of using the accelerator 1800, such as by using the host CPU 1710 to perform the operation.

In various embodiments, the I/O page fault is reported via a specified mechanism such as an event log 1812 and proxied to the client application 1801. System software (e.g. the device driver or OS) can then fix the page-fault based on the information received in event-log entry and passes on a completion record to the client 1801 (acting as a proxy). In some embodiments, the completion record buffer 1811 is used to directly notify the client 1801 about the page-fault and corresponding information.

A single accelerator device 1800 may use any of the above techniques at different times or for different purposes.

The following are typical sources of page faults in accelerator SVM environments:
1. Source/Destination Buffers: Most accelerator devices have source/input buffer(s) from where the data is read, processed/operated upon and then written to destination/output buffer(s).
2. Completion-Record/Response-Queue Buffers: Many high-performance and scalable devices rely on completion-record or response-queue slots where a memory write is generated to notify software about the work-completion.
3. Descriptor List Buffer/Ring: Many high-performance devices rely on descriptor list or ring to communicate/execute multiple descriptors with a single work submission/doorbell-hit.
4. Scatter-Gather List Buffer: Some accelerator devices communicate the address of scatter-gather list instead of communicating source/destination addresses directly.
5. Operation Specific Buffers: Some accelerator devices allow software to specify additional buffer addresses depending upon the operation (e.g. CRC Seed Address, Drain Readback Address, Delta Record Address, . . . ).
6. Configuration and Control Structures: Some accelerator devices may also have configuration and control structures which may run into a page-fault during the workload execution (e.g. offload/work context, permission tables, . . . )

Figure 19A:
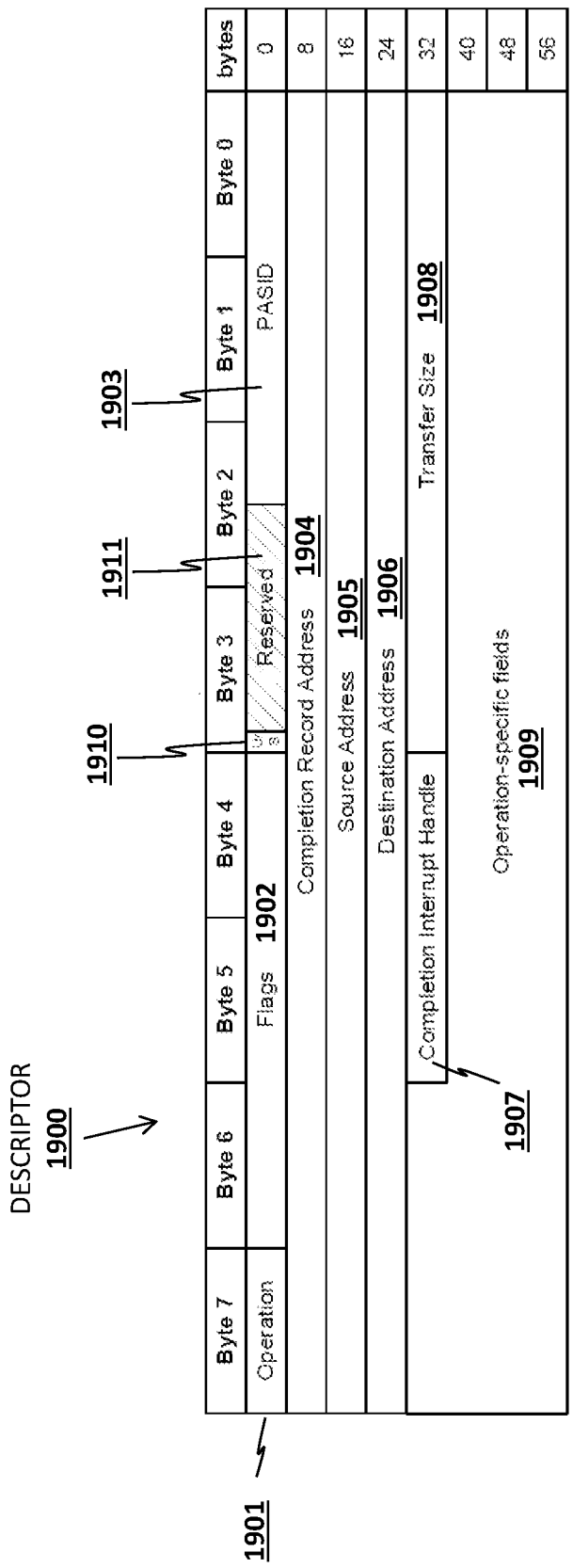
FIG. 19A illustrates a descriptor in accordance with embodiments of the invention.

FIG. 19A illustrates an example of a work-descriptor 1900 which may be submitted to a work queue 1801A and interpreted by an accelerator engine 1821A to perform work. The work descriptor 1900 includes an operation field 1901 to specify the operation to be performed, a plurality of flags 1902 (e.g., Completion Record Address Valid, Request Completion Record, Request Completion Interrupt), a process address space identifier (PASID) field 1903 to associate the work descriptor with a process/application which generated the work, a completion record address field 1904 to indicate a memory location for a completion record (e.g., to store metadata related to the work performed), a source address field 1905 to indicate a memory location for source data, a destination address field 1906 to indicate a memory location for result data, a completion interrupt handle 1907, a transfer size field 1908, and (potentially) one or more operation-specific fields 1909 to specify additional details for the operation to be performed.

Figure 19B:
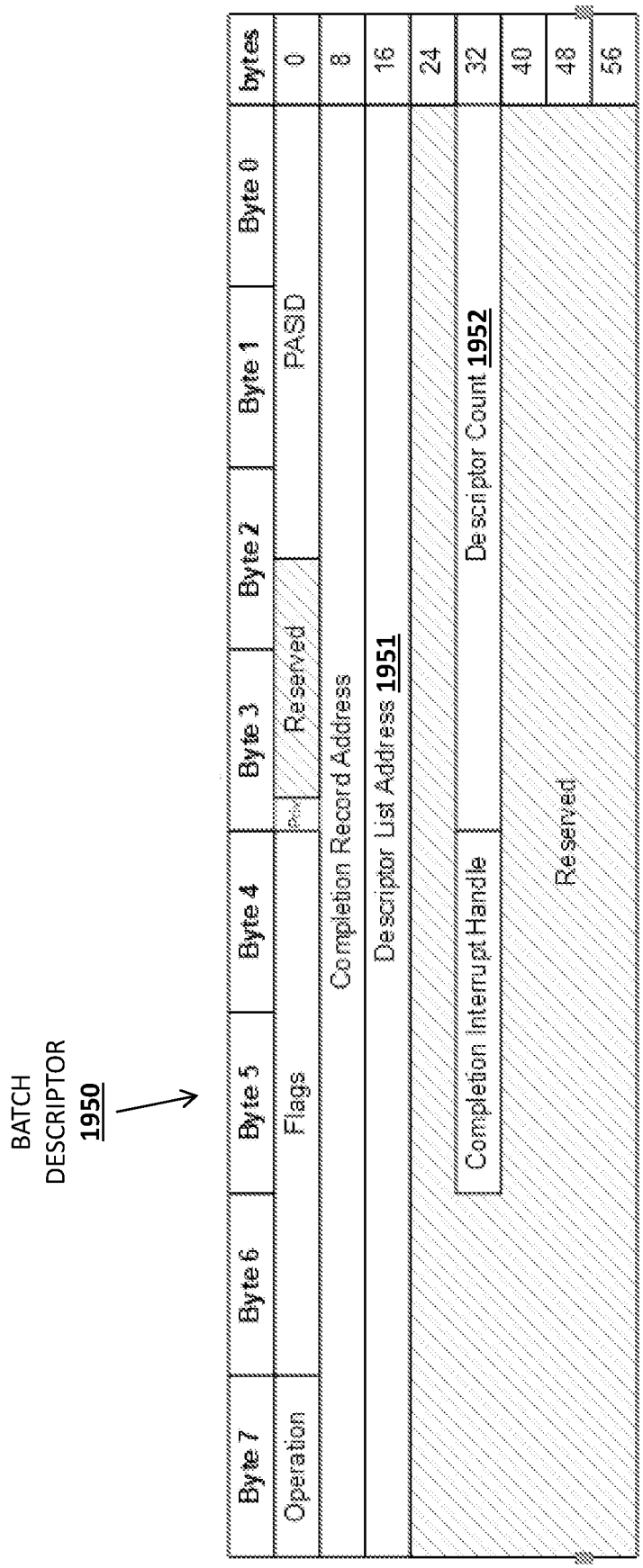
FIG. 19B illustrates a batch descriptor in accordance with embodiments of the invention.

An example of a batch descriptor 1950, illustrated in FIG. 19B, includes many of the same fields as the work descriptor 1900, with the exceptions of a descriptor list address 1951 identifying the memory location of a list (or batch) of descriptors and a descriptor count field 1952 to indicate the number of descriptors in the list.

Figure 20:
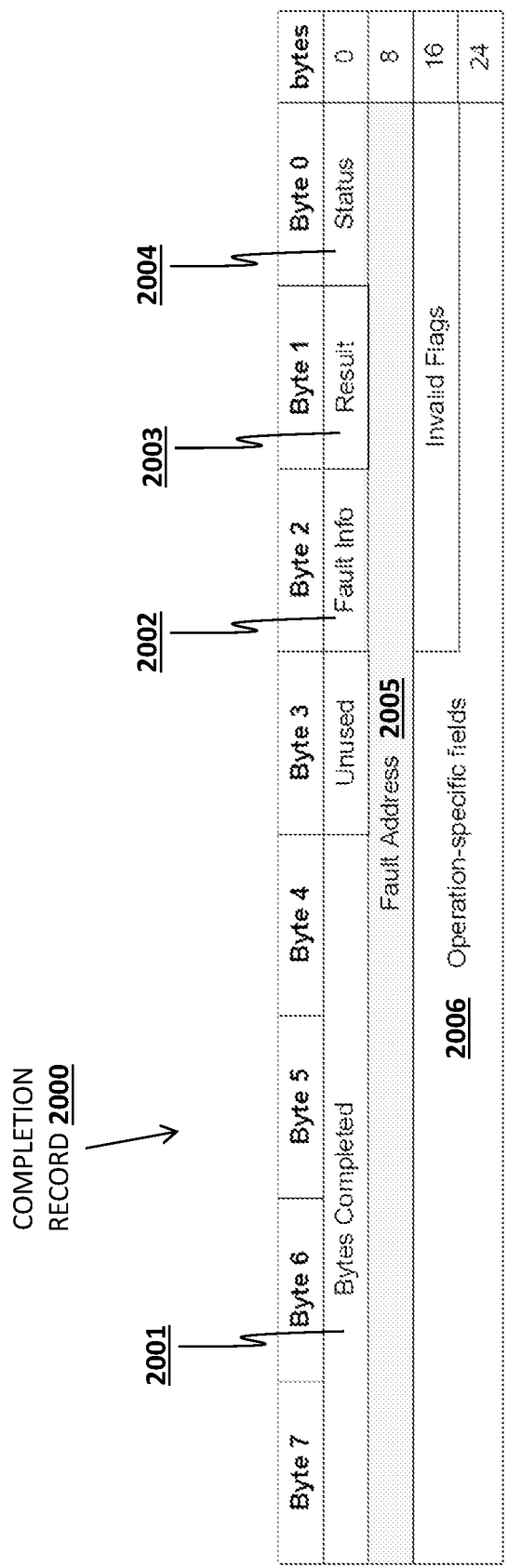
FIG. 20 illustrates a completion record generated by the accelerator.

FIG. 20 illustrates an example of a completion record 2000. In one embodiment, the accelerator engine 1821A which performed the work identified by a descriptor generates a completion record, which is stored within a completion record buffer 1811. The client 1801 which submitted the work may then access the completion record from the buffer.

As illustrated in FIG. 20, in some implementations, the completion record 2000 is a 32-byte structure, written to the buffer 1811 when the requested work is complete or encounters an error. In certain embodiments, the engine 1821A writes sufficient information in the completion record 2000 to allow the engine 1821A to continue the operation if it was only partially completed due to a page fault.

A completion status field 2004 indicates whether the operation has completed. If the operation completed successfully, the completion record 2000 may contain the result of the operation, if any, depending on the type of operation (e.g., in operation-specific fields 2006 or result field 2003). The result may also be stored in a different location in memory, and identified by an address in the completion record 2000. If the operation did not complete successfully, the completion record contains fault or error information within fault info field 2003.

In one implementation, if this completion record 2000 is for a descriptor that was submitted as part of a batch, an index field (not shown) contains the index in the batch of the descriptor that generated this completion record. For a Batch descriptor, this field may be 0xff. For any other descriptor that is not part of a batch, this field may be reserved.

In one implementation, if the operation was partially completed due to a page fault, the bytes completed field 2001 indicates the number of source bytes processed before the fault occurred. All of the source bytes represented by this count were fully processed and the result written to the destination address, as needed according to the operation type. For some operation types, this field may also be used when the operation stopped before completion for some reason other than a fault. If the operation fully completed, this field may be set to 0. For operation types where the output size is not readily determinable from this value, the completion record 2000 also contains the number of bytes written to the destination address. If the operation was partially completed due to a page fault, the fault address field 2005 contains the address that caused the fault.

As mentioned, embodiments of the invention use the completion record buffer 1811 to directly notify the client 1801 about the page-fault and provide corresponding information. For example, the fault address field 2005 indicates the address associated with the page-fault, a fault info field 2002 captures information associated with the page-fault such as the type of buffer and whether the fault-address field 2005 is valid, and the status field 2004 communicates associated status information.

When the page-fault is observed on the completion-record address itself, however, it may not be feasible to use the completion record buffer 1811 to convey this information to the client 1801. In this situation, a memory-based event log 1812 can be used to log such events. An event log 1812 of this type may be implemented per-accelerator device 1800, per-engine 1821A-C, and/or per-work queue 1801A-C.

Figure 21:
FIG. 21 illustrates an event log entry generated by the accelerator in accordance with embodiments of the invention.

FIG. 21 illustrates an example of an event log entry 2100 with a plurality of fields to provide information related to an associated descriptor and/or fault condition. Errors on the completion record 2000 of a descriptor or during processing of a descriptor that does not have a valid completion record address are normally reported in a register (the Software Error Register). The occurrence of multiple such errors before software has processed the register results in an overflow condition.

Figure 22:
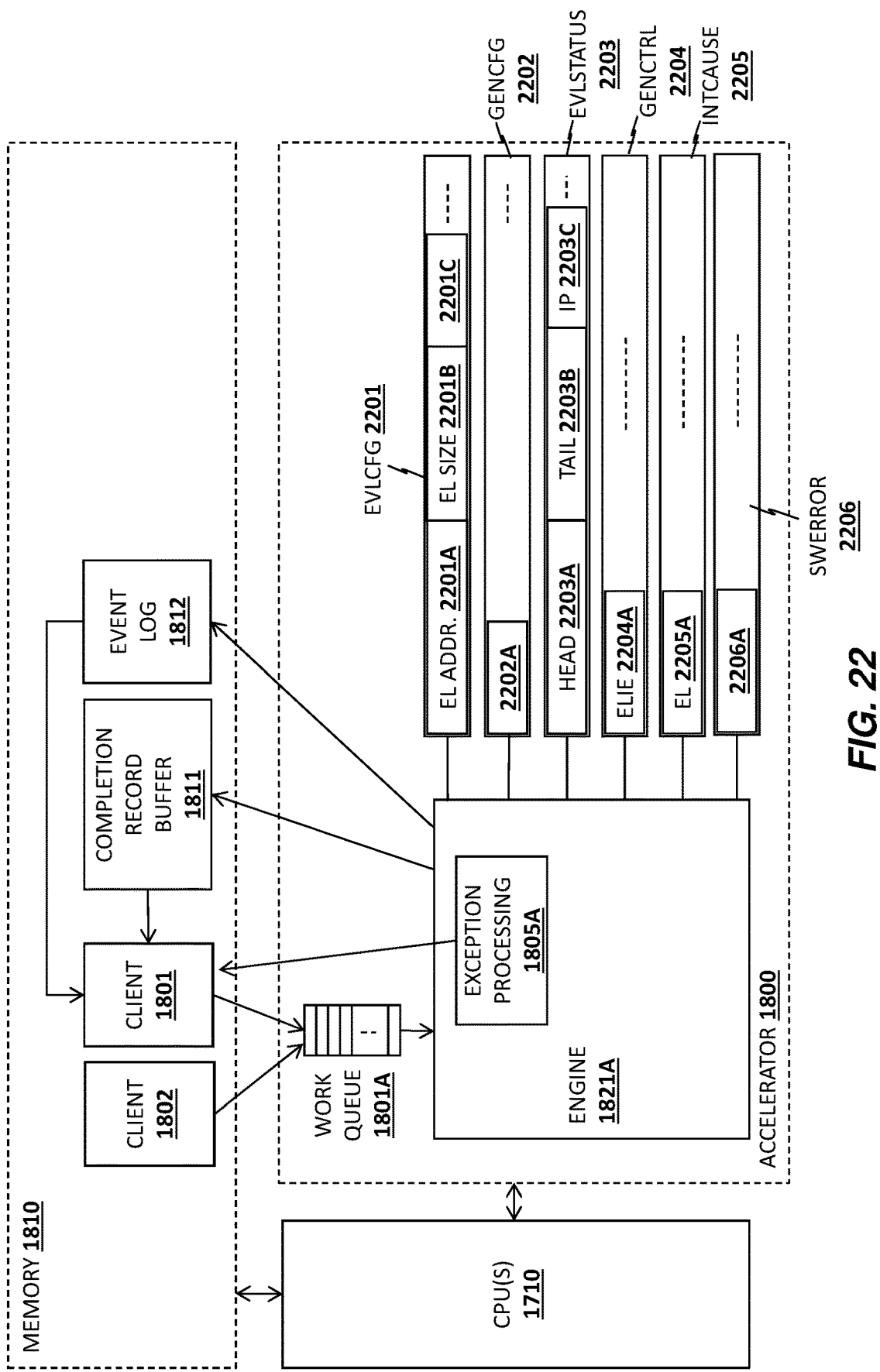
FIG. 22 illustrates an accelerator comprising a plurality of control registers.

In contrast, embodiments of the invention support logging of such events in an event log 1812 in memory. As illustrated in FIG. 22, an event log configuration register (EVLCFG) 2201 is configured to store the address and size of the event log memory region. The event log 1812 is enabled when an event log enable bit is set to 1 in an accelerator control register, illustrated as general configuration register (GENCFG) 2202 in FIG. 22.

In contrast to writes to the completion record buffer 1811, writes to the event log 1812 may be issued as either translated or untranslated memory accesses. In some implementations, software pins memory pages corresponding to the event log and event log writes are performed with a traffic class (TC) value of 0.

In at least some embodiments, if the PASID enable field 2201C in EVLCFG 2201 is 1, writes to the event log 1812 are issued as writes using the PASID and the corresponding privilege level (also stored in EVLCFG 2201 in some implementations). If the event log 1812 is enabled, the accelerator device 1800 initializes a head field 2203A and a tail field 2203B in an event log status register (EVLSTATUS) 2203 (when the device 1800 is enabled). Once enabled, hardware writes each event to the offset specified by the event log tail field 2203B and increments the tail value 2203B. When the tail reaches the end of the log, it wraps to a value of 0. The next event to be processed by software is specified by the event log head field 2203A. Software updates the head field 2203A after processing one or more events at the head of the event Log. The log is full when the tail value+1 mod log-size=the head value.

At the time of writing an event to the event log 1812, if the event log Interrupt Enable field 2204A in an accelerator control register (GENCTRL) 2204 is 1 and the Interrupt Pending bit 2203C in EVLSTATUS is 0, hardware sets the Interrupt Pending bit 2203C to 1, sets the event log field 2205A of the Interrupt Cause register (INTCAUSE) 2205 to 1, and generates an interrupt (e.g., using MSI-X entry 0 if the accelerator 1800 includes MSI-X support). No further interrupts are generated for additional log entries until software clears the Interrupt Pending bit 2203C. If the event log 1812 is full when hardware tries to append an event, hardware blocks until software updates the event log Head field 2203A after processing one or more events from the head of the log. Hence software must ensure that the event log region in memory is adequately sized, and that event log entries are processed in a timely manner.

In various embodiments, if hardware encounters a page fault on a completion record address while the page request service (PRS) is disabled, it is reported as an error. If the event log 1812 is enabled, hardware writes an entry to the event log with an appropriate error code indicating the cause of the page fault; otherwise it is reported via a field 2206A in the Software Error Register (SWERROR) 2206. In the former case, hardware also writes the completion record 2000 for that descriptor to the event log entry. Completion records 2000 written to the event log 1812 have the same format as described above. Software responsible for processing the event log 1812 is expected to perform the necessary actions to propagate the completion record 2000, where appropriate, to the software entity that submitted the faulting descriptor (e.g., Client 1801). Software can also generate the completion interrupt, if requested.

Figure 23:
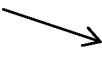
FIG. 23 illustrates an example of a batch completion record.

Referring to FIG. 23, if the completion record for any descriptor in a batch is written to the event log 1812 due to a page fault on the completion address, the batch completion record 2300 for the corresponding batch descriptor 1950 is also written to the event log 1812, if either a completion record or a completion interrupt is required for the batch descriptor. In this case, the error code in the event log entry for the batch descriptor 1950 indicates that one or more descriptors in the batch have associated event log entries with completion records 2000 that must be processed by software. In various embodiments, the accelerator 1800 generates a batch identifier value to allow software to correlate event log entries 1812 for descriptors within a batch and for the corresponding batch descriptor 1950 and is reported in the batch identifier field of an event log 1812 entry. A batch identifier may be reused by hardware once the event log entry for the batch descriptor has been written. An event log entry with the first error in batch flag as 1 identifies the first entry for that batch. This allows software to identify any stale event log entries with the same batch identifier. If software encounters an entry with this flag as 1, any outstanding page faults previously recorded for the same batch identifier can be discarded.

Figure 24:
FIG. 24 illustrates an example drain descriptor and drain completion record.

An example drain descriptor 2400 and drain completion record 2401 are illustrated in FIG. 24. A drain descriptor waits for completion of certain preceding descriptors in the work queue 1801A that the drain descriptor 2400 is submitted to. If a drain descriptor 2400 is submitted to a dedicated work queue, it waits for completion of all descriptors in the work queue. If a drain descriptor is submitted to a shared work queue 1801A, it waits for descriptors in the work queue that were submitted with the same PASID as the drain descriptor. To wait for all descriptors with a particular PASID, software submits a separate drain descriptor to every work queue that the PASID was used with.

In some embodiments, the completion for a drain descriptor 2400 is always written to the event log 1812 if it is enabled. If the event log 1812 is not enabled, the drain descriptor completion record 2401 is written to the completion record address.

Figure 25:
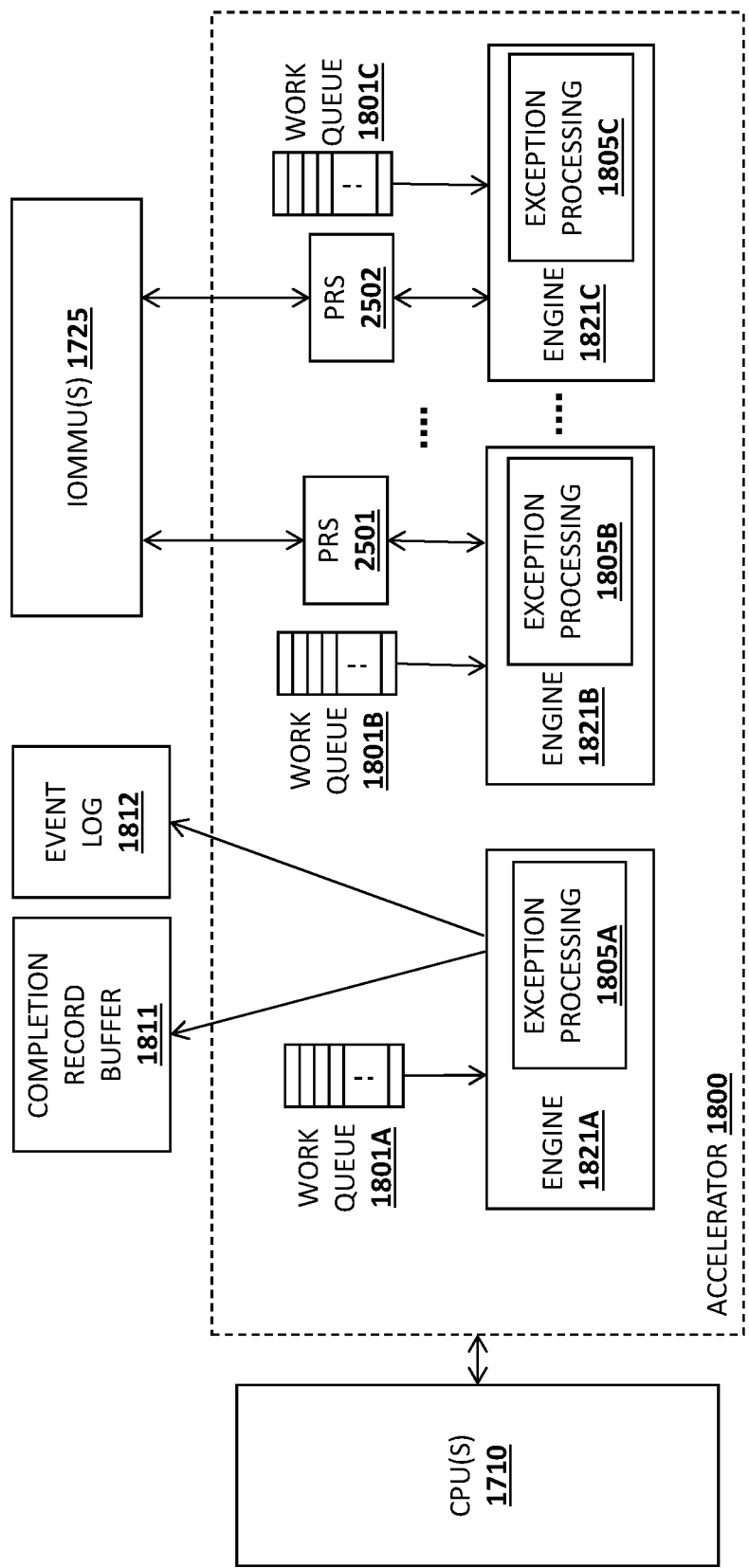
FIG. 25 illustrates an accelerator with a plurality of engines and work queues, at least some of which use page request services.

As illustrated in FIG. 25, at least some embodiments of the invention implement per-WQ Page Request Services (PRS) 2501-2502 which may be dynamically enabled and disabled on a per-WQ basis. In FIG. 25, for example, PRS 2501 and PRS 2502 have been dynamically enabled for work queues 1801B and 1801C, respectively, and disabled for work queue 1801C, which uses the high-performance techniques described herein rather than PRS (e.g., terminating work and submitting an entry to the event log 1812 and/or completion record buffer 1811).

A capability bit is provided in a control register in one embodiment to indicate whether per-WQ PRS can be disabled on the given scalable accelerator 1800. The capability bit may be provided in any of the registers described above. When supported, a per-WQ control bit indicates whether PRS is enabled or disabled for a particular WQ—even when it is enabled at the level of the accelerator device 1800, providing fine-grained control over page fault handling. In some implementations, for example, when the per-WQ control bit is set (i.e., set to 1) for a particular work queue, one or more of the scalable page fault handling techniques described herein are used. When cleared (i.e., binary 0), legacy page-fault handling techniques are used.

Figure 26:
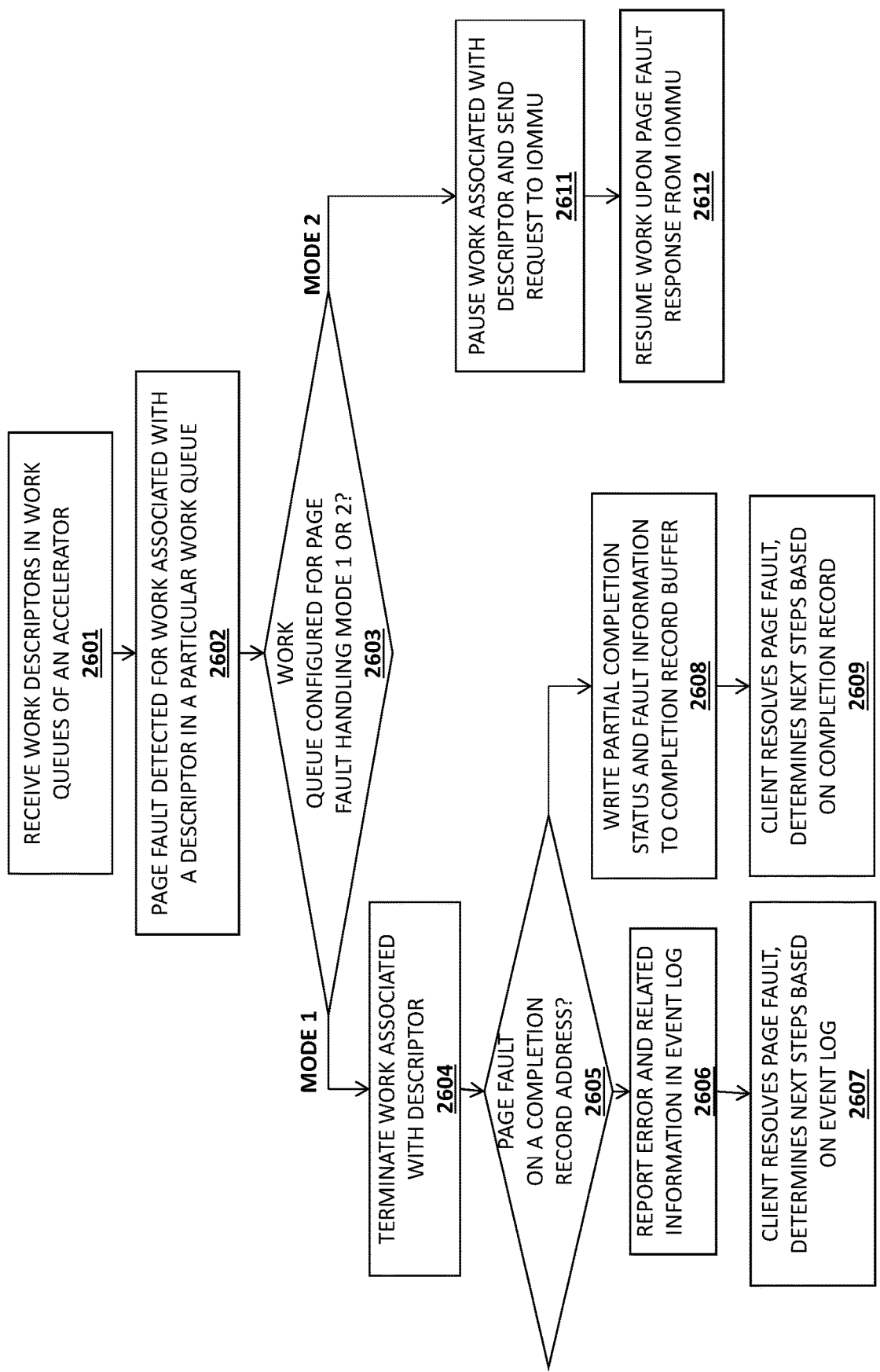
FIG. 26 illustrates a method in accordance with embodiments of the invention.

FIG. 26 illustrates a method in accordance with embodiments of the invention. At 2601, work descriptors are received in work queues of an accelerator and, at 2602, a page fault is detected for work associated with a descriptor in a particular work queue.

The page fault is handled differently depending on the page fault mode configured for the particular work queue, determined at 2603. For example, when a page fault occurs and PRS 2501-2502 is enabled for the associated work queue 1801A-B (Mode 2 in FIG. 26), work associated with the descriptor is paused and the page fault is reported as a PRS request to the IOMMU 1725 for servicing by the OS page fault handler at 2611. The IOMMU 1725 notifies the OS through an interrupt. The OS validates the address and upon successful checks creates a mapping in the page table and returns a PRS response through the IOMMU 1725 at 2612. The descriptor encountering the fault is blocked until the PRS response is received. Other operations behind the descriptor with the fault may also be blocked. If the OS was not able to create a mapping, it returns an error response and the descriptor is completed with an error. The error reporting is the same as page fault reporting when PRS is disabled, described in the next section.

As described above, for work queues 1801A with PRS disabled (Mode 1 in FIG. 26), work associated with the descriptor is terminated at 2604. When a page fault occurs on a completion record address, determined at 2605, the error is reported in the event log, if enabled, at 2606 (or in the SWERROR register 2206 in some embodiments). At 2607, the client resolves the page fault and determines next steps based on the event log. Completion record faults reported in the event log 1812 are recoverable. The descriptor is completed and the event log entry contains the completion record address and the contents of the completion record. After handling the page fault, system software can copy the completion record to the completion record address. Completion record faults reported in SWERROR may not recoverable: faults may be lost since only a single error can be logged; and the descriptor is not completed and must be restarted, since partial completion information is not recorded.

When a page fault occurs for an address in a descriptor other than a completion record address, determined at 2605, the engine 1821A stops the operation and writes the partial completion status along with the faulting address and progress information into the completion record in the completion record buffer 1911 (as described above) at 2608. When the client software receives a completion record indicating partial completion, it resolves the page fault and determines next steps based on the completion record at 2609. For example, the client has the option to fix the fault on the host processor (by touching the page, for example) and submit a new work descriptor with the remaining work. Alternatively, software can complete the remaining work on the host processor.

Operating with PRS disabled and the event log enabled as described above reduces the impact on other applications in the presence of page faults, thereby improving performance.

In some implementations, if a descriptor within a batch descriptor 1950 takes a fault due to the completion address, the entry is pushed to the event log 1812. Before the event log entry can be processed (e.g., by the device driver software), the client 1801 can potentially observe an update to the overall batch descriptor completion record 2200—thereby causing inconsistent state or ordering/timing issue with respect to completion record updates. A similar problem applies to the drain descriptor 2300.

The following embodiments address this issue. If the completion record for any descriptor in a batch is written to the event log 1812 (e.g. due to completion record related page-fault), then the completion for the corresponding batch descriptor 1950 is also written to the event log, if either a completion record or a completion interrupt is required for the batch descriptor 1950.

Each event log entry for a descriptor within a batch or for a batch descriptor with page-fault related error code contains a batch identifier that is used (e.g., by the kernel mode driver (KMD)) to associate completion records in the event log with the same batch.

If there is a page fault on the completion record 2200 address for a batch descriptor, and there were no event log entries with error code ABC written for any descriptor in the batch, the event log entry for the batch descriptor is written with error ABC. If there is a page fault on the completion record address for a batch descriptor, and there were event log entries with error code ABC written for any descriptor in the batch, the event log entry for the batch descriptor is written with error XYZ. Using different error codes ABC/XYZ allows software to distinguish between these two situations.

In some embodiments, while PRS 2501-2502 is disabled, page faults are handled by stopping the operation and reporting a partial completion status in the completion record. Additionally, page faults on completion record addresses are reported through the event log 1812 while it is enabled. In at least one implementation, the kernel-mode driver (KMD) is responsible for configuring and enabling the event log 1812. In these implementations, the KMD must ensure that the event log 1812 is sufficiently large and must process entries in a timely manner to avoid subsequent event log writes from the device getting blocked due to the event log being fully consumed.

In the event that the client 1801 is notified of the page-fault directly through the completion record, the client can fix the (valid) page-fault by accessing the page. Once the page-fault is corrected, the client 1801 has an option of completing the remaining work on the CPU or re-starting/continuing the work by again offloading to the accelerator 1800 (e.g., storing a new work descriptor in the work queue 1801A).

In various embodiments, when processing an entry in the event log 1812 for a page fault on a completion record, the KMD or other privileged software component performs the following operations:

1. If the First Error in Batch flag is 1, discard any previously-recorded errors associated with the batch identifier. This can happen when a batch completion is lost because of an Abort command or an internal hardware error. In the usual case, no errors will be recorded, and no action needs to be taken.
2. Attempt to fix the page fault corresponding to the fault address and PASID reported in the event log 1812 entry, and if successful, write the completion record to the fault address and generate the completion interrupt, if the event log entry indicates that a completion interrupt should be generated.
3. If there is an error writing the completion record and the completion record is for a descriptor in a batch, the KMD (or other software component) associates the error with the batch identifier of the event log entry and tracks it until the event log entry for the corresponding batch descriptor is observed. KMD does not need to track successfully written completion records.

When processing an event log entry for a batch descriptor with the error code indicating that one or more descriptors in the batch had event log entries and the event log entry indicates that a completion record for the batch descriptor should be written, the KMD or other privileged software component does the following before writing the batch completion record to memory provided an error has been recorded with a matching batch identifier:

1. If the status of the completion record within the event log entry indicates that all descriptors were successful, KMD (or other component) changes it to indicate that one or more descriptors failed.
2. The KMD or other component should then clear the recorded error in preparation for the next batch with the same batch identifier.

If no error has been recorded for this batch (all completion records were written successfully), the KMD or other component writes the batch completion record as-is. Software should then generate the completion interrupt, if the event log entry indicates that an interrupt should be generated.

When an application, user mode driver (UMD), or other client 1801 receives a completion record indicating partial completion, it can choose to fix the page fault and resubmit a descriptor to the accelerator device 1800 to complete the remainder of the operation. In most cases, the original descriptor may need to be updated to adjust the transfer size field based on the amount of work already completed. For certain operations, additional updates to the original descriptor may be required. When resubmitting a batch descriptor that was terminated early, software can set the Batch Error flag in the descriptor based on the status of the partially completed batch to ensure that the status of the final completion record for the batch reflects the correct status across all the descriptors in the batch.

For virtualized configurations, the host software may expose a virtual event log to the guest and may inject fault information to the guest (e.g., via the guest KMD) to manage page faults as described above.

Embodiments of the invention described herein include one or more of the following:

Selection of per-WQ page fault handling capabilities, including selection between PRS-based page-fault handling and high-performance page-fault handling described above.

The ability to directly notify an application/offload-client about the accelerator page-fault (when possible) and use of an event-log to allow the accelerator driver to proxy the page-fault handling/notification to offload-clients (when direct notification is not feasible/recommended).

Premature completion of faulted contexts with immediate switch to the next context.

Handling the page-fault in software and completing the remaining work either on the host processor or by offloading again to the accelerator device.

Techniques for handling batch descriptors.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

EXAMPLES

The following are example implementations of different embodiments of the invention.

Example 1. An apparatus comprising: one or more accelerator engines to process work descriptors submitted by clients to a plurality of work queues; and fault processing hardware logic associated with the one or more accelerator engines, the fault processing hardware logic to implement a specified page fault handling mode for each work queue of the plurality of work queues, the page fault handling modes including a first page fault handling mode and a second page fault handling mode.

Example 2. The apparatus of example 1, wherein in the first page fault handling mode, the fault processing logic is to notify a client and terminate processing of a work descriptor associated with a page fault.

Example 3. The apparatus of example 2 wherein the fault processing hardware logic is to submit information to a completion record buffer and/or an event log responsive to the page fault, the information associated with the page fault and usable by the client and/or system software to resolve the page fault.

Example 4. The apparatus of example 3 wherein the information is to allow the client to continue processing or re-submit work associated with the descriptor if the work was only partially completed due to the page fault.

Example 5. The apparatus of example 4 wherein the information comprises a fault-address and a bytes completed field to indicate a number of source bytes processed before the page fault occurred.

Example 6. The apparatus of example 3 wherein if the page fault occurs on an address associated with the completion record buffer, then the information is submitted to the event log but not the completion record buffer.

Example 7. The apparatus of example 6 wherein the event log is to be associated with a particular accelerator engine of the one or more accelerator engines or a particular work queue of the plurality of work queues.

Example 8. The apparatus of example 1 wherein in the second page fault handling mode, processing of the work descriptor is to be paused and the fault processing hardware logic is to generate a page request to memory management hardware logic, the processing of the work descriptor to resume only after receiving a response from the memory management hardware logic.

Example 9. A method comprising: processing work descriptors by an accelerator engine, the work descriptors submitted by clients to a plurality of work queues; in response to detecting a page fault associated with a work descriptor in a particular work queue: determining a page fault handling mode associated with the work queue, and notifying the client and terminating processing of a work descriptor associated with the page fault if the page fault handling mode comprises a first page fault handling mode.

Example 10. The method of example 9 further comprising: if the page fault handling mode comprises a second page fault handling mode, performing the operations of: pausing work associated with the work descriptor and transmitting a page fault request to memory management hardware logic, and resuming the work associated with the work descriptor after receiving a response from the memory management hardware logic.

Example 11. The method of example 9, further comprising: submitting information to a completion record buffer and/or an event log responsive to the page fault, the information associated with the page fault.

Example 12. The method of example 11 wherein, based on the information, the client is to continue processing or re-submit work associated with the work descriptor if the work was only partially completed due to the page fault.

Example 13. The method of example 12 wherein the information comprises a fault-address and a bytes completed field to indicate a number of source bytes processed before the page fault occurred.

Example 14. The method of example 11 wherein if the page fault occurs on an address associated with the completion record buffer, then the information is submitted to the event log but not the completion record buffer.

Example 15. The method of example 11 wherein if the page fault information for the first work descriptor is submitted to the event log, then the page fault information for the second work descriptor is also submitted to the event log but not the completion record buffer.

Example 16. The method of example 15 wherein at least one work descriptor comprises a batch descriptor comprising a descriptor list address identifying a memory location of a batch of descriptors or a drain descriptor to cause the accelerator engine to wait for completion of specified preceding descriptors in the work queue before processing the drain descriptor.

Example 17. A machine-readable medium having program code stored thereon which, when executed by a machine, causes the machine to perform the operations of: processing work descriptors by an accelerator engine, the work descriptors submitted by clients to a plurality of work queues; in response to detecting a page fault associated with a work descriptor in a particular work queue: determining a page fault handling mode associated with the work queue, and notifying the client and terminating processing of a work descriptor associated with the page fault if the page fault handling mode comprises a first page fault handling mode.

Example 18. The method of example 17 further comprising: if the page fault handling mode comprises a second page fault handling mode, performing the operations of: pausing work associated with the work descriptor and transmitting a page fault request to memory management hardware logic, and resuming the work associated with the work descriptor after receiving a response from the memory management hardware logic.

Example 19. The method of example 17, further comprising: submitting information to a completion record buffer and/or an event log responsive to the page fault, the information associated with the page fault.

Example 20. The method of example 19 wherein, based on the information, the client is to continue processing or re-submit work associated with the descriptor if the work was only partially completed due to the page fault.

Example 21. The method of example 20 wherein the information comprises a fault-address and a bytes completed field to indicate a number of source bytes processed before the page fault occurred.

Example 22. The method of example 19 wherein if the page fault occurs on an address associated with the completion record buffer, then the information is submitted to the event log but not the completion record buffer.

Example 23. The method of example 19 wherein if the page fault information for the first work descriptor is submitted to the event log, then the page fault information for the second work descriptor is also submitted to the event log but not the completion record buffer.

Example 24. The method of example 23 wherein at least one work descriptor comprises a batch descriptor comprising a descriptor list address identifying a memory location of a batch of descriptors or a drain descriptor to cause the accelerator engine to wait for completion of specified preceding descriptors in the work queue before processing the drain descriptor.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
one or more accelerator engines to process work descriptors submitted by clients to a plurality of work queues; and
fault processing hardware logic associated with the one or more accelerator engines, the fault processing hardware logic to implement a specified page fault handling mode for each work queue of the plurality of work queues, page fault handling modes for the plurality of work queues including a first page fault handling mode and a second page fault handling mode, wherein upon a page fault occurring on an address associated with a completion record buffer, information associated with the page fault is submitted to an event log but not the completion record buffer.

2. The apparatus of claim 1, wherein in the first page fault handling mode, the fault processing hardware logic is to notify a client and terminate processing of a work descriptor associated with the page fault.

3. The apparatus of claim 1 wherein the information is to allow a client to continue processing or re-submit work associated with a work descriptor if the work was only partially completed due to the page fault.

4. The apparatus of claim 3 wherein the information comprises a fault-address and a bytes completed field to indicate a number of source bytes processed before the page fault occurred.

5. The apparatus of claim 1 wherein the event log is to be associated with a particular accelerator engine of the one or more accelerator engines or a particular work queue of the plurality of work queues.

6. The apparatus of claim 1 wherein in the second page fault handling mode, processing of a work descriptor is to be paused and the fault processing hardware logic is to generate a page request to memory management hardware logic, the processing of the work descriptor to resume only after receiving a response from the memory management hardware logic.

7. A method comprising:
processing work descriptors by an accelerator engine, the work descriptors submitted by clients to a plurality of work queues; and
in response to detecting a page fault associated with a work descriptor in a work queue:
determining a page fault handling mode associated with the work queue, and
notifying a client who submitted the work descriptor and terminating processing of the work descriptor associated with the page fault if the page fault handling mode comprises a first page fault handling mode,
wherein if the page fault occurs on an address associated with a completion record buffer, information associated with the page fault is submitted to an event log but not the completion record buffer.

8. The method of claim 7 further comprising:
if the page fault handling mode comprises a second page fault handling mode, performing operations of: pausing work associated with the work descriptor and transmitting a page fault request to memory management hardware logic, and resuming the work associated with the work descriptor after receiving a response from the memory management hardware logic.

9. The method of claim 7 wherein, based on the information, the client is to continue processing or re-submit work associated with the work descriptor if the work was only partially completed due to the page fault.

10. The method of claim 9 wherein the information comprises a fault-address and a bytes completed field to indicate a number of source bytes processed before the page fault occurred.

11. The method of claim 7 wherein information associated with a page fault for a second work descriptor is also submitted to the event log but not the completion record buffer.

12. The method of claim 11 wherein at least one work descriptor comprises a batch descriptor comprising a descriptor list address identifying a memory location of a batch of descriptors or a drain descriptor to cause the accelerator engine to wait for completion of specified preceding descriptors in the work queue before processing the drain descriptor.

13. A non-transitory machine-readable medium having program code stored thereon which, when executed by a machine, causes the machine to perform:
    processing work descriptors by an accelerator engine, the work descriptors submitted by clients to a plurality of work queues; and
    in response to detecting a page fault associated with a work descriptor in a work queue:
        determining a page fault handling mode associated with the work queue, and
        notifying a client who submitted the work descriptor and terminating processing of the work descriptor associated with the page fault if the page fault handling mode comprises a first page fault handling mode,
        wherein if the page fault occurs on an address associated with a completion record buffer, information associated with the page fault and usable by a client and/or system software to resolve the page fault is submitted to an event log but not the completion record buffer.

14. The non-transitory machine-readable medium of claim 13, wherein the machine is caused to further perform:
    if the page fault handling mode comprises a second page fault handling mode, performing: pausing work associated with the work descriptor and transmitting a page fault request to memory management hardware logic, and resuming the work associated with the work descriptor after receiving a response from the memory management hardware logic.

15. The non-transitory machine-readable medium of claim 13 wherein, based on the information, the client is to continue processing or re-submit work associated with the work descriptor if the work was only partially completed due to the page fault.

16. The non-transitory machine-readable medium of claim 15 wherein the information comprises a fault-address and a bytes completed field to indicate a number of source bytes processed before the page fault occurred.

17. The non-transitory machine-readable medium of claim 13 wherein information associated with a page fault for a second work descriptor is also submitted to the event log but not the completion record buffer.

18. The non-transitory machine-readable medium of claim 17 wherein at least one work descriptor comprises a batch descriptor comprising a descriptor list address identifying a memory location of a batch of descriptors or a drain descriptor to cause the accelerator engine to wait for completion of specified preceding descriptors in the work queue before processing the drain descriptor.

* * * * *